United States Patent [19]
Nagasawa et al.

[11] Patent Number: 5,754,506
[45] Date of Patent: May 19, 1998

[54] OPTICAL DISK DRIVE AND OPTICAL DISK HAVING ADDRESS PITS FOR SECTORS IN LAND AND GROOVE TRACKS

[75] Inventors: Masato Nagasawa; Kouichi Komawaki; Tsuyoshi Katayama, all of Tokyo, Japan

[73] Assignee: Mitsubishi Denki Kabushiki Kaisha, Tokyo, Japan

[21] Appl. No.: 753,302

[22] Filed: Nov. 22, 1996

[30] Foreign Application Priority Data

Nov. 24, 1995 [JP] Japan ................... 7-305682

[51] Int. Cl.⁶ .................................................. G11B 7/08
[52] U.S. Cl. .................. 369/44.26; 369/275.4; 369/44.29; 369/44.35
[58] Field of Search ................... 369/44.26, 44.29, 369/44.34, 44.35, 54, 275.3, 275.4

[56] References Cited

U.S. PATENT DOCUMENTS

| | | | |
|---|---|---|---|
| 4,707,816 | 11/1987 | Yonezawa et al. | 369/44.26 |
| 5,422,874 | 6/1995 | Birukawa et al. | |
| 5,444,682 | 8/1995 | Yamada et al. | 369/44.26 |
| 5,452,284 | 9/1995 | Miyagawa et al. | 369/44.26 |
| 5,508,995 | 4/1996 | Moriya et al. | 369/275.4 |
| 5,615,205 | 3/1997 | Belber | 369/275.4 |

FOREIGN PATENT DOCUMENTS

| | | |
|---|---|---|
| 0570235 | 11/1993 | European Pat. Off. . |
| 0656625 | 11/1994 | European Pat. Off. . |
| 0727779 | 8/1996 | European Pat. Off. . |
| 0757343A1 | 8/1996 | European Pat. Off. . |
| 62-183037 | 8/1987 | Japan . |
| 0438633 | 2/1992 | Japan . |
| 6-274896 | 9/1994 | Japan . |
| 6-290465 | 10/1994 | Japan . |
| 0757302 | 3/1995 | Japan . |

OTHER PUBLICATIONS

Ohtake et al., "Composite Wobbled Tracking in the Optical Disk System", Dec. 12–13, 1985; pp. 181–188.

Kaku et al., "Investigation of Compensation Method for Track Offset", Dec. 12–13, 1985; pp. 209–214.

*Primary Examiner*—Thang V. Tran

[57] ABSTRACT

In an optical disk of a single-spiral configuration, and including a first sequence of address pits and a second sequence of address pits, wherein headers include first and second sequences of address pits provided in different positions along the track. The first sequence of address pits are shifted by half a track pitch in a first radial direction so that its center line is aligned with a first boundary between a land track and a groove track following the header. The second sequence of address pits are shifted in a second radial direction opposite to the first radial direction by half a track pitch so that its center line is aligned with a second boundary (next to the first boundary) between a land track and a groove track following the header. The first sequence of address pits indicate an address of a sector in a first one of a land track and a groove track following the header. The second sequence of address pits indicate an address of a sector in a second one of a land track and a groove track following the header. The disk may further comprises mirror surface parts provided following the first and second sequences of address pits in a header at the connecting point. The offset in the tracking error signal is detected when the light spot is scanning the sequences of address pits and/or the mirror surface parts.

15 Claims, 24 Drawing Sheets

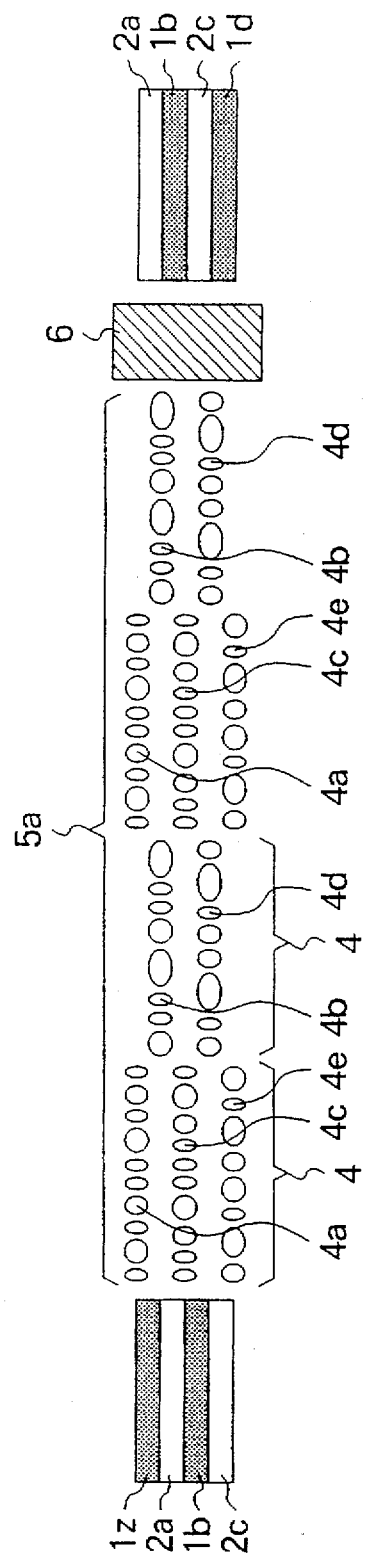
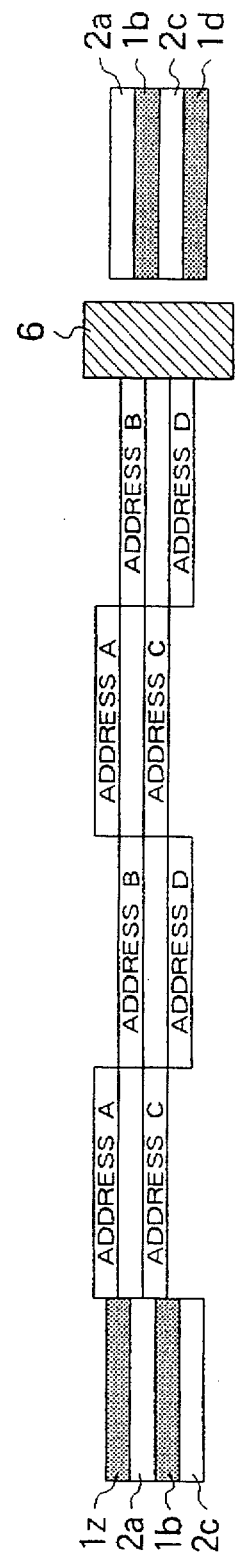
FIG. 3A
FIG. 3B

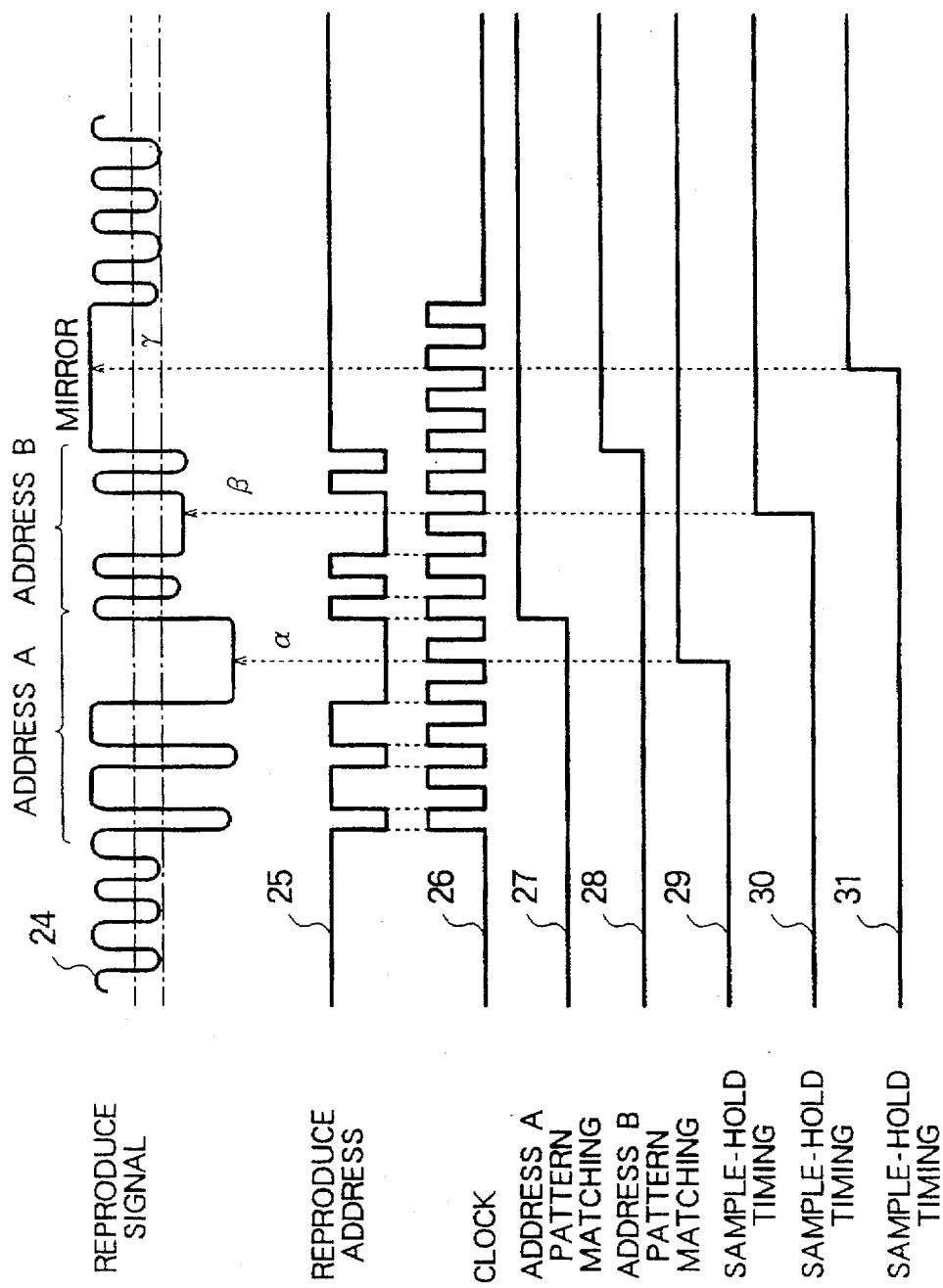

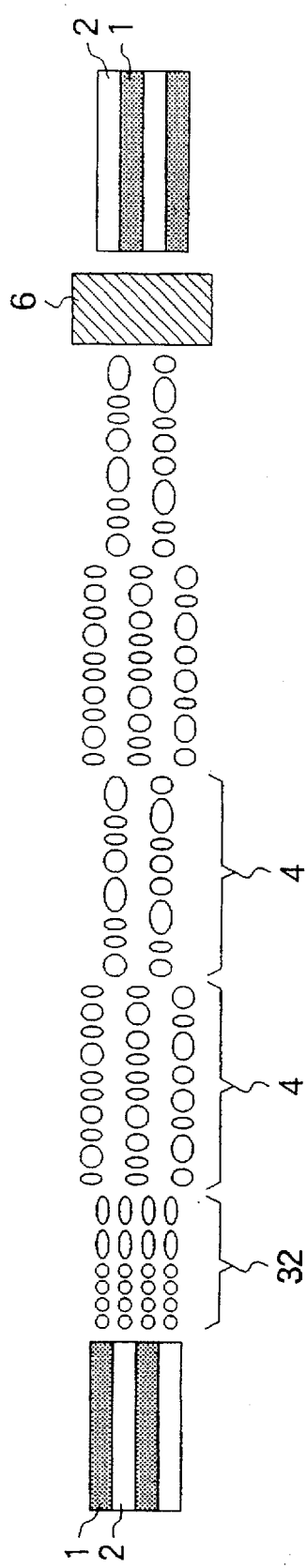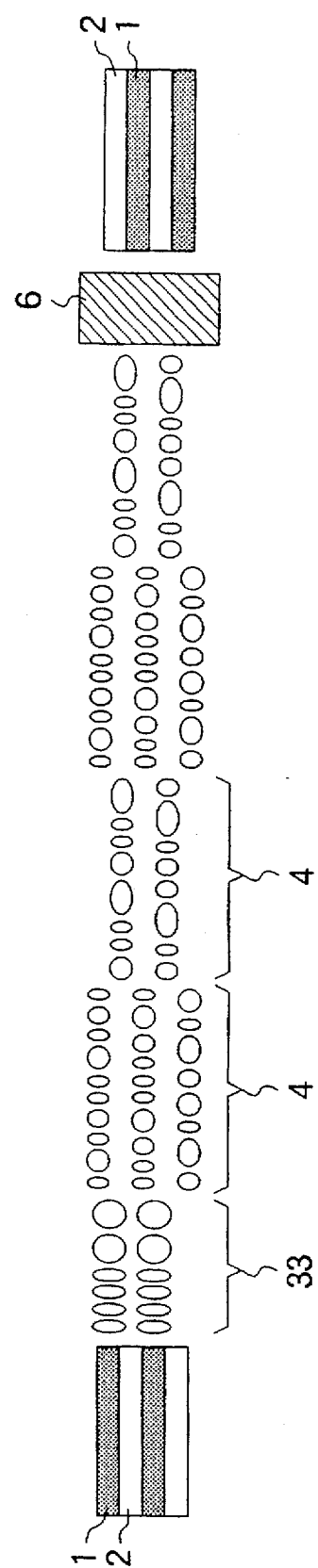

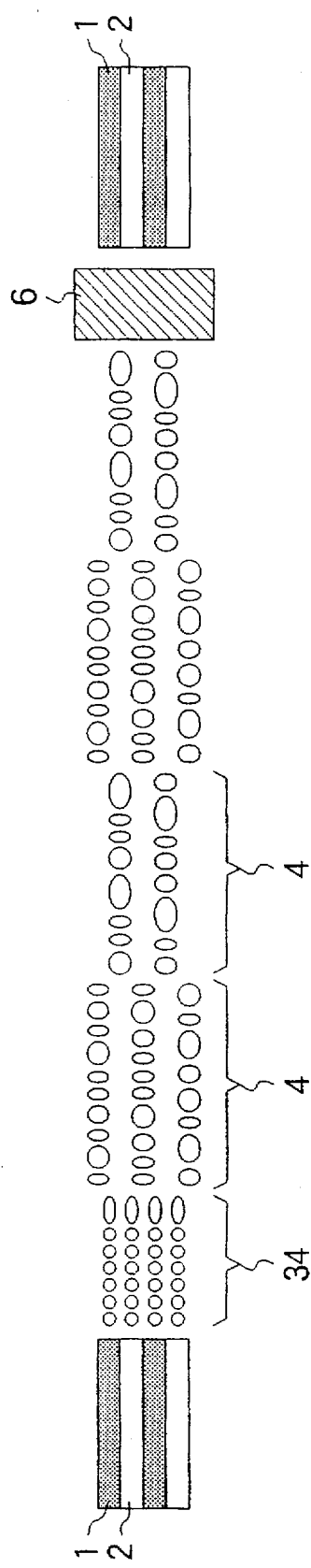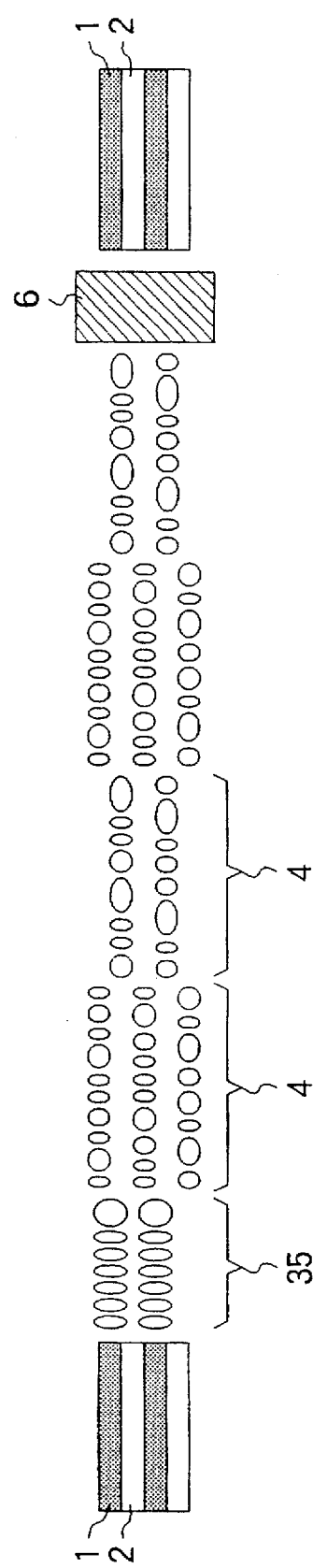

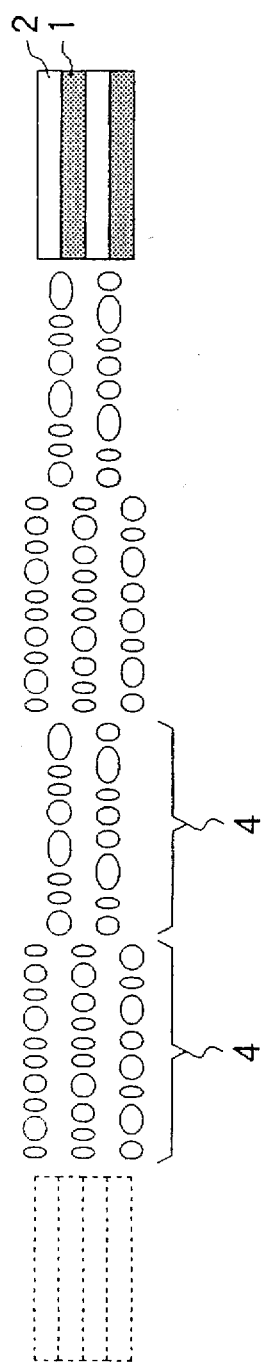
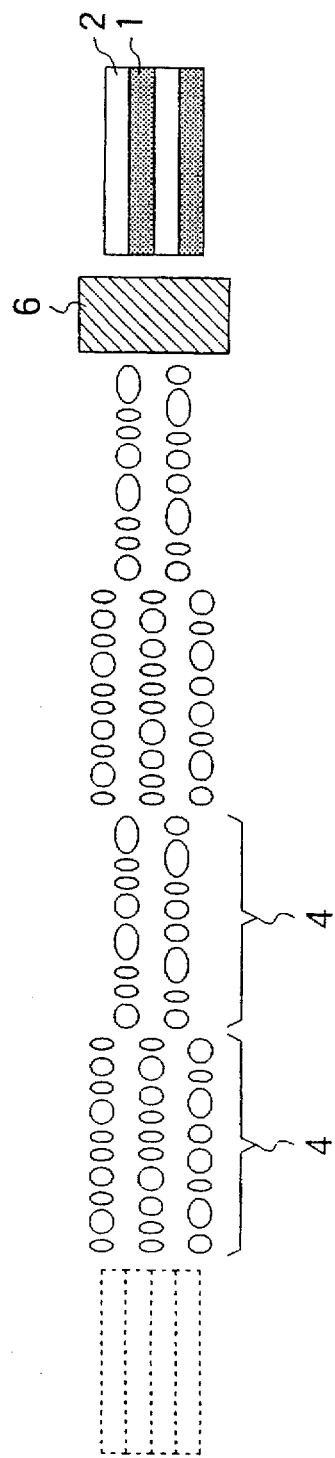

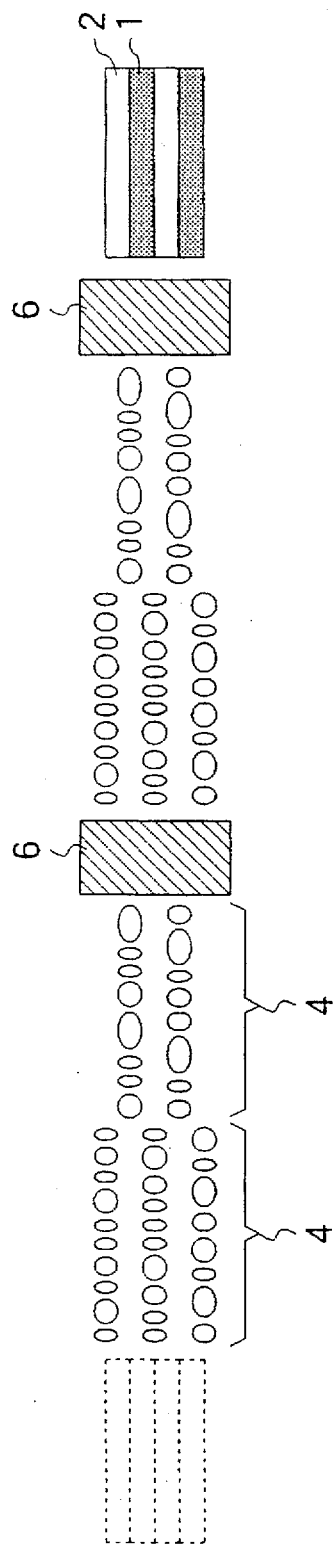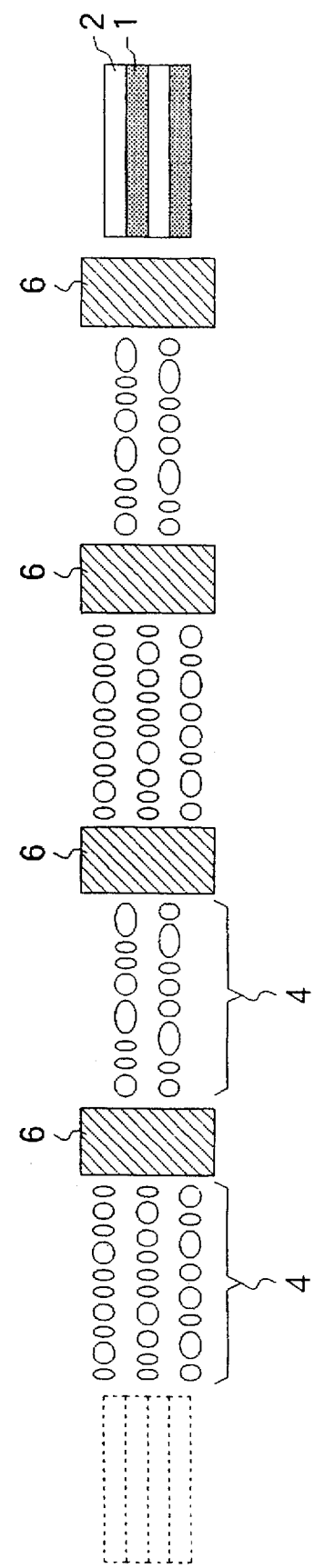

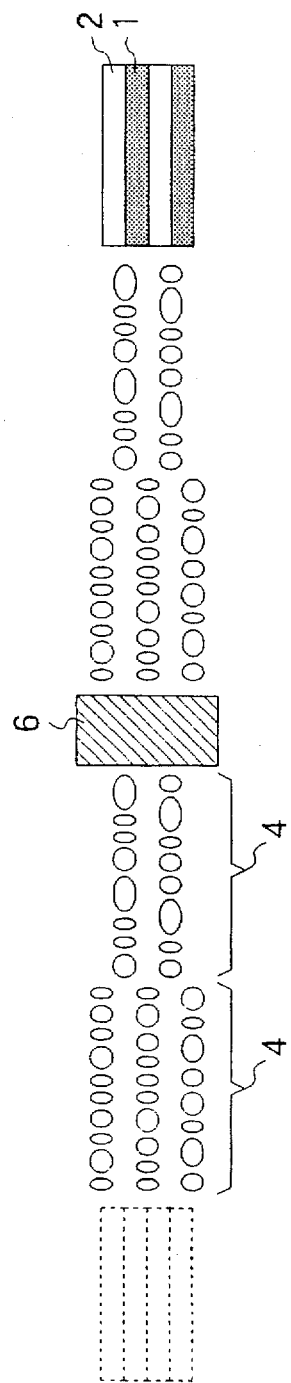
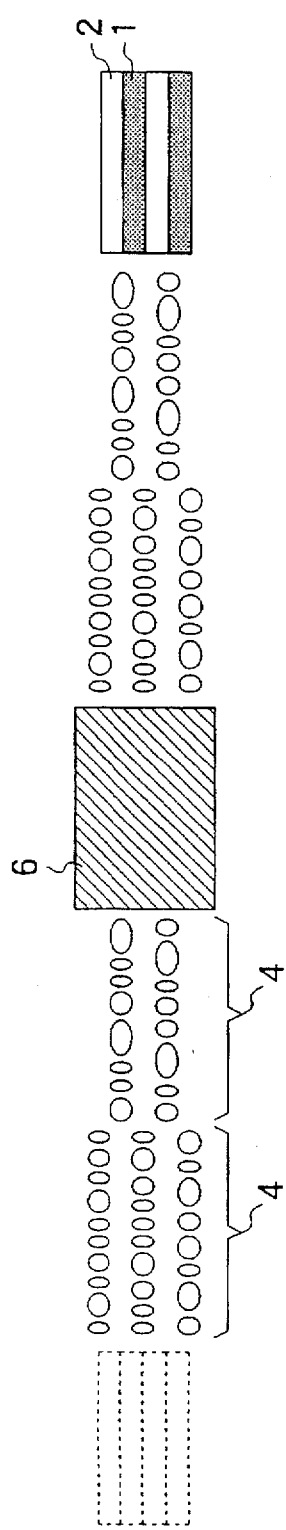
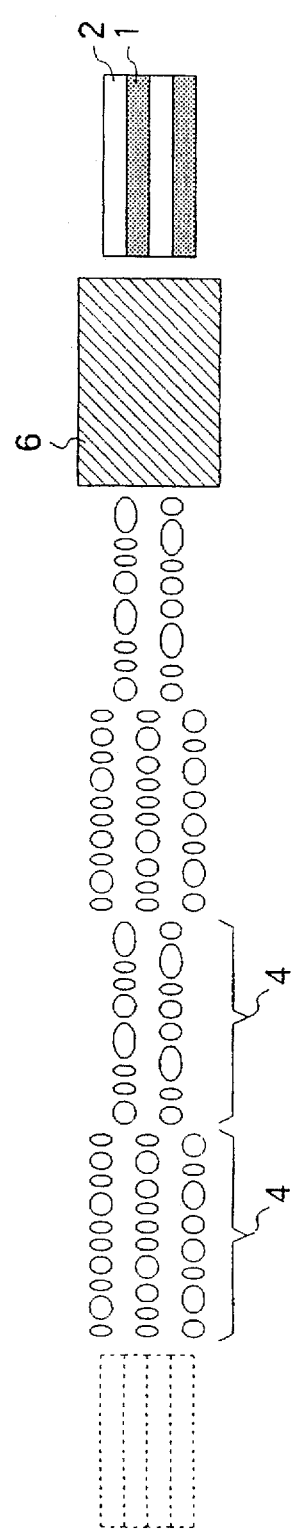

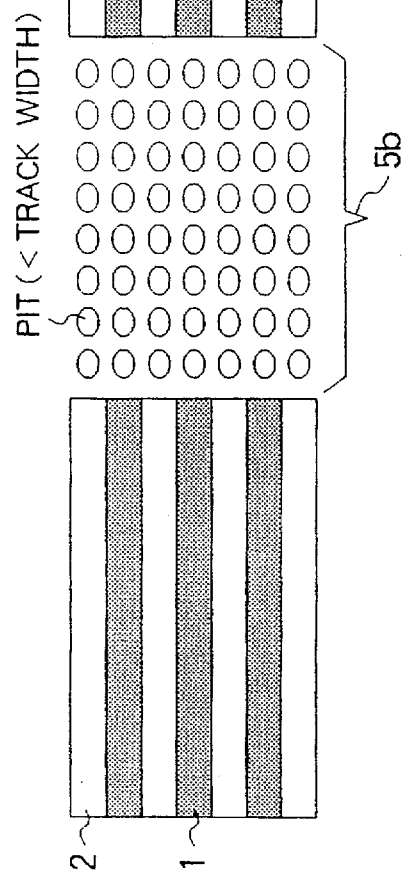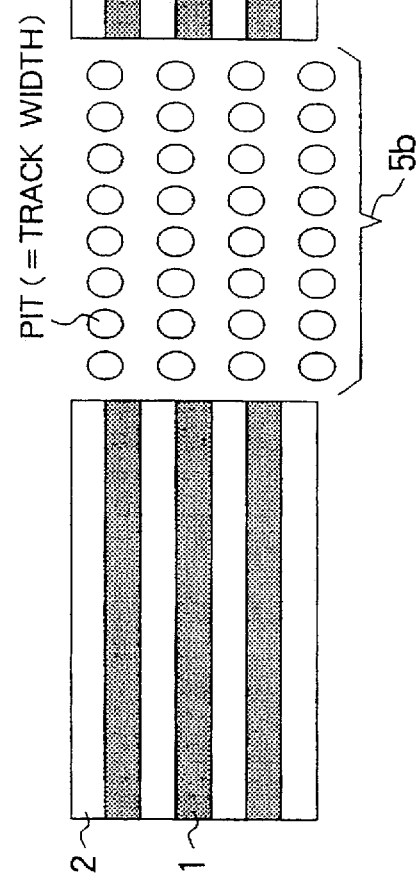
FIG. 22A PRIOR ART
FIG. 22B PRIOR ART

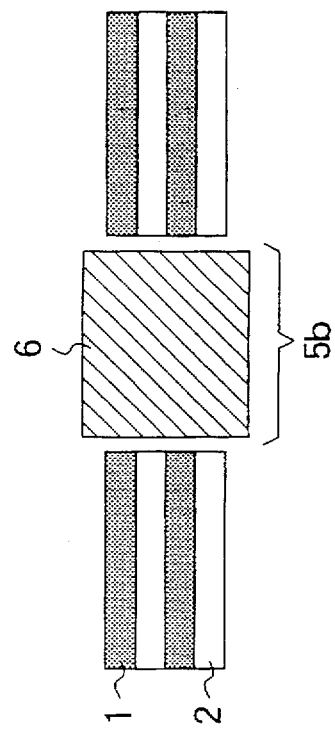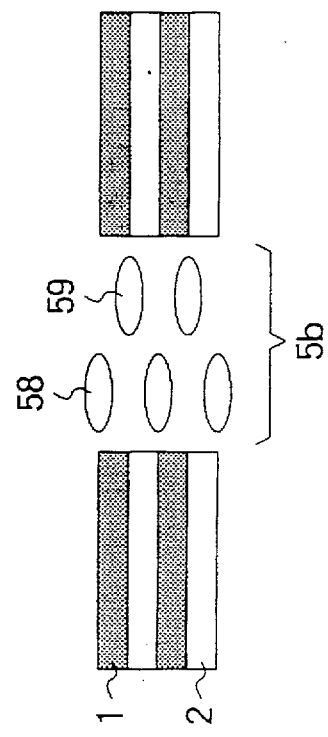
FIG. 24A PRIOR ART
FIG. 24B PRIOR ART

OPTICAL DISK DRIVE AND OPTICAL DISK HAVING ADDRESS PITS FOR SECTORS IN LAND AND GROOVE TRACKS

BACKGROUND OF THE INVENTION

The present invention relates to an optical disk of a single-spiral land/groove configuration, wherein information is recorded on lands and grooves, land tracks and groove tracks alternate to form a single spiral.

The invention also relates to an optical disk drive device using such an optical disk.

In conventional phase-change type optical disks, data is recorded only on grooves, and lands serve to guide the light spot for tracking, and to reduce crosstalks from adjacent groove tracks. If data is recorded on lands as well, the track density can be doubled on condition that the width of the grooves and the width of the lands are both unchanged. It has been discovered that the crosstalk between adjacent land track and groove track is reduced if the difference in height between the lands and grooves is $\lambda/6$ ($\lambda$ being the wavelength of the light source). Because of this discovery, the use of both of the land and groove tracks has become feasible. The use of both land and groove tracks is also advantageous with regard to the ease of mastering of the disk: it is easier to attain a certain recording density by the use of both land and groove tracks than by reducing the track pitch using only the groove tracks.

For instance, in the case of optical disks for use as computer data files, optical disks in which data is recorded both on land and groove tracks, and the tracks are concentric, so that after recording of one revolution (on a groove track, for example), a track jump is effected to start writing on the adjacent track (a land track). Sectors are managed in accordance with the sector addresses. Accordingly, the operation for recording and reproducing data, such as computer data, which need not be continuous, can be carried out without difficulty.

Rewritable optical disks are however also used for recording continuous data such as motion picture, or music. In multimedia applications (where computer data and video and audio data are mixed), spiral tracks, as in compact disks, may be preferred because of the continuity of the tracks. For instance, FIG. 21 shows a track pattern of a disk for recording on land tracks and groove tracks in the prior art. Groove tracks 1 and land tracks 2 between adjacent groove tracks 1 are divided into information recording sectors by header parts 5b, each sector forming a unit for recording data.

With the configuration shown in FIG. 21, all the groove tracks 1 form a single spiral, and all the land tracks 2 form another spiral. For recording or reproduction, the light beam traces from the beginning (inner end) of the spiral formed of the groove tracks, for example, and upon arrival at the end (outer end) of the spiral, the light beam jumps to the beginning of the other spiral formed of the land tracks. Switching between the groove track spiral and the land track spiral requires access between the inner and outer peripheries of the information recording region of the disk, and therefore a certain time delay is inevitable.

The information recording region of the disk may be divided into annular zones, so that the length over which the light spot must jump for switching between the groove track spiral and the land track spiral is shortened to the distance between the outer and inner peripheries of the annular zone. However, there is still a considerable time delay for the jump.

FIG. 22A and FIG. 22B show details of the header portion in a conventional optical disk wherein data is recorded on both groove and land tracks. FIG. 22A shows the case where headers 5b are provided separately for the land and groove tracks, and addresses dedicated to the sectors in the respective tracks are formed. FIG. 22B shows the case where headers 5b are provided on an extension of a boundary between land and groove tracks, and each address is shared by the sectors in the land and groove tracks separated by the boundary. In either case, the headers include address pits 4.

The header portion 5b is formed of embossments (dents or projections) physically formed for representing the address information and the like of the sector preceded by the header. Specifically, pits having the same height as the lands, or pits having the same depth as the grooves are formed in the header portion where no tracks are formed.

There are several methods for forming prepits suitable for the land/groove recording configuration. Two principal ones are those shown in FIG. 22A and FIG. 22B. In the configuration shown in FIG. 22A, dedicated prepits are provided for each sector of the land or groove track. Because the dedicated prepits can record various items of information, such as the one indicating whether the sector following the dedicated prepits is a land track sector or a groove track sector, control in the optical disk drive device is facilitated. However, the width of the prepits must be sufficiently narrower than the track width. This means that the laser beam used for forming the tracks cannot be used for forming the prepits, but a less powerful laser beam must be used for the formation of the prepits, and the fabrication of the medium is difficult.

In the configuration shown in FIG. 22B, the prepits are shared by the land and groove tracks adjacent to each other. The prepits can be formed by the using the same laser beam used for forming the tracks, and by shifting the laser beam by ½ of the track pitch laterally of the track, i.e., in the radial direction of the disk. However, during writing or reading of the disk, the shared prepits cannot indicate whether the sector following the prepits is in a land track or in a groove track, so that the optical disk drive device must have a means to find whether a land track or groove track is being traced by the light spot, and the control in the optical disk drive device is difficult.

In the above-described optical disk allowing recording and reproduction, it is also necessary to solve the problem of the track offset. This relates to the fact that the one beam-and-push-pull method is used for the tracking, rather than a three-beam method. This is because the recording requires a greater laser power. Also, in pit-forming recording on a write-once disk or the like, the side spots (used in a three-beam method) causes a disturbance to the tracking operation.

In a push-pull tracking, the tracking error is detected using the diffraction distribution of the light spot illuminating the pregrooves as shown in FIG. 23, and fed to the servo system. More particularly, an optical head 8 has a laser diode 60 emitting a laser beam, which is passed through a half-mirror 61 and an objective lens 62 to illuminate an optical disk 7 rotated by a disk motor 64. The reflected light beam from the light spot on the disk 7 is guided by the objective lens 62 and the half-mirror 61 and is received by a photodetector 16, and the tracking error is detected using the diffraction distribution of the light spot on the optical disk 7. The detected tracking error is used to control an actuator coil 63 for driving the objective lens 62.

For instance, a tilting of 0.7 degrees or an eccentricity of a 100 µm (equivalent to lateral movement of the objective lens 62 of 100 μm as indicated by broken lines in FIG. 23) causes shifting of a light distribution 17 on the photodetector 16, and an offset of 0.1 μ. To prevent such a phenomenon, a drive device having higher mechanical and optical accuracy is used, and various other contrivances are adopted.

FIG. 24A shows a mirror surface part 6 provided in a header region 5b, and used in a mirror surface correction method. FIG. 24B shows wobble pits 58 and 59 provided in a header region 5b, and used in a wobble pit correction method. The wobble pit pits 58 and 59 are shifted in the radial direction by ½ of the track pitch are used. These methods are described in the following publications:

(1) Ohtake, et al. "Composite Wobbled Tracking in the Optical Disk System," on pp. 181–188 in Optical Memory Symposium '85, held on Dec. 12–13 in 1985, published by Optical Industry Technology Promotion Association, (2) Kaku, et al. on "Investigation of compensation method for track offset," pp. 209–214 in Optical Memory Symposium '85, held on Dec. 12–13 in 1985, published by Optical Industry Technology Promotion Association.

FIG. 25 shows a track offset correction circuit used in combination with a disk having the mirror surface portion 6 shown in FIG. 24A. A split photodetector 16 detects the tracking error by a push-pull method. An adder 11 adds the outputs of the two half-portions of the split photodetector 16 to produce a signal indicative of the total amount of light received, which corresponds to the total amount of light reflected from the disk. A differential amplifier 12 determines the difference between the outputs of the two half-portions of the split photodetector 16, to produce a signal indicative of the tracking error. A mirror surface detector 13 detects the mirror surface portion 6. A sample-hold circuit 14 samples and holds the tracking error signal when the light spot passes the mirror surface portion 6, and holds the sampled value as an offset information. A differential amplifier 15 determines the difference between the tracking error signal and the offset information. The output of the differential amplifier 15 indicates the tracking error having the offset removed.

FIG. 26 shows an offset correction circuit used in combination with a disk having wobble pits shown in FIG. 24B. A wobble pit detector 18 receives the output of the adder 11, and detects the wobble pits, i.e., produces a signal to a sample-hold circuit 19 when the light spot passes the wobble pit laterally shifted toward one side of the track, and produces another signal to a sample-hold circuit 20 when the light spot passes the wobble pit laterally shifted toward the other side of the track. Responsive to these signals (i.e., when the light spot passes the wobble pits 58 and 59), the sample-hold circuits 19 and 20 sample the output of the differential amplifier 12, and holds the sampled values. A differential amplifier 21 determines the difference of the outputs of the sample hold circuits 19 and 20, as an offset. An adder 50 adds the tracking error signal obtained at the differential amplifier 21 to the tracking error signal obtained by means of the ordinary push-pull method, to produce the tracking error signal from which the offset has been removed.

FIG. 27 illustrates the control characteristics for the case where a tracking error signal obtained by wobble pits and the tracking error signal by means of the conventional push-pull method are both used. G1 represents a tracking open loop characteristic by means of the conventional push-pull method, and G2 denotes a tracking open loop characteristic by means of the wobble pits.

In the configuration shown in FIG. 24A, at the mirror surface portion 6, the guide grooves are discontinuous or interrupted. With this configuration, a correction circuit for correcting the mirror surface offset, shown in FIG. 25, is used. The signals output from the two half-portions of the split photodetector 16 are input to the differential amplifier 12, which thereby produces a tracking error signal. On the basis of the sum signal produced by the adder 11, the mirror surface detector 13 generates a timing signal indicating the timing at which the light beam is passing the mirror surface portion 6. The tracking error signal Δ T produced by the differential amplifier 12 includes an error component Δ Tg due to the shift of the objective lens, a true tracking error Δ Ts, and an offset component δ due to various causes including the tilting of the disk, so that it is given by:

$$\Delta T = \Delta Ts + \Delta Tg + \delta \tag{1}$$

The sample-hold circuit 14 samples the tracking signal at the mirror surface portion 6, and holds the sampled value. The output of the sample-hold circuit 14 represents ΔTg+δ. Accordingly, in view of the equation (1), subtracting the output of the sample-hold circuit 14 from the output of the differential amplifier 12 at the differential amplifier 15 during the scanning of the data sectors results in the true tracking signal ΔTs. In this way, a closed-loop servo system for achieving an accurate track following can be formed.

Another method of correction is a method using wobble pits. According to this method, wobble pits shifted in opposite directions as shown in FIG. 24B are formed by alternately deflecting the light beam, using ultrasonic deflector, during fabrication of the original disk for mastering. During recording and reproduction, the outputs of the differential amplifier 12 when the light spot is passing the wobble pits on the respective sides are compared, to detect the tracking error. Specifically, a differential amplifier 21 shown in FIG. 26 determines the difference between the outputs of the sample-hold circuits 19 and 20 to obtain the tracking error. As shown in FIG. 28, when the light spot passes along a line closer to the center of the pit 58 on one side (upper side in FIG. 24B) than to the center of the pit 59 on the other side (lower side in FIG. 24B), an output signal illustrated by the dotted line is obtained. When the light spot passes along a line closer to the center of the pit 59 on the lower side than to the center of the pit 58 on the upper side, an output signal illustrated by the solid line is obtained. The difference obtained by subtracting the output of the differential amplifier 12 obtained when the light spot is passing the wobble pit 59 at the back, from the output of the differential amplifier 12 obtained when the light spot is passing the wobble pit 58 at the front, represents the magnitude of the tracking error and the direction of the tracking error. This means that the position at which the true light spot passes is detected. Compared with the method relying on the diffraction distribution due to pregrooves, the above-described method realizes a better servo system.

Another tracking method has been proposed, in which the feature of the above-described wobble pit method is maintained, and which is compatible with systems using conventional push-pull tracking method. The sector configuration in this system is composed of an index field with pre-pits shown in FIG. 24B, and user data field. The index field is provided with address information, as well as wobble pits detection m may not serve also as a sector detection mark, and pre-grooves for tracking. With such a configuration, the true tracking error is detected from the wobble pits, and the offset used in push-pull tracking can be corrected. In this case, the open-loop characteristic of the tracking servo is such that the gain for tracking on the basis of the wobble pits is relatively large in the low-frequency region, and the gain for the tracking on the basis of the push-pull method is relatively large in the high-frequency region, as shown in FIG. 27. As a result, data can be recorded and reproduced, while the light spot is maintained on the center of the track, regardless of the drive device used, and compatibility between the recorded disk and the drive device can be preserved.

With the above-described optical disk device, information is recorded on lands and grooves to increase the recording density. One way of recording continuous information, such as video and audio information, on lands and grooves in an optical disk, is to connect each revolution of land with each revolution of adjacent land, so that recording track alternate between land and groove every revolution. In such a configuration, the polarity of tracking error signal has to be reversed every revolution. At the time of the tracking error signal polarity reversal, offset is reversed, and the servo operation may be disturbed, or servo error may occur.

In particular, such an offset is due to the error in the mounting of the tracking sensor in the optical head, and a tracking offset due to stray light, and the offset due to these factors are reversed when the polarity of the tracking error signal is reversed.

A method has been proposed in which a mirror portion interrupting the track guide grooves, or pits offset by half a pitch in the lateral direction of the tracks are provided to eliminate the sensor offset due to shift of the objective lens or tilting of the disk. But this method does not prevent reversal of the offset due to the reversal of the tracking error signal polarity. If the polarity of the tracking error signal is reversed, the servo operation is disturbed due to the above-described reversal of the offset.

SUMMARY OF THE INVENTION

The present invention has been achieved to solve the problems described above, and its object is to provide an optical disk and an optical disk drive device capable of recording and reproducing continuous information on lands and grooves in an optical disk.

Another object is to provide an optical disk and an optical disk drive device with which a correct tracking offset can be instantly applied, even at the time of reversal of the tracking error signal polarity at the connecting point between lands and grooves, and disturbance in the tracking servo is prevented at the time of the switching between lands and grooves.

A third object of the invention is to provide an optical disk and an optical disk drive device with which, at the time of the reversal of the tracking error signal polarity, sensor adjustment error and offset due to stray light can be removed, and the offset due to shifting of the objective lens or tilting of the disk can also be removed.

A fourth object of the invention is provide a method of identifying whether the next information sector is one in a land, or one in a groove, and whether it is necessary to reverse the tracking polarity, during recording or reproducing information.

According to one aspect of the invention, there is provided an optical disk of a single-spiral configuration, in which land tracks and groove tracks are connected at connecting points, occurring every revolution, so that land tracks and groove tracks alternate along a continuous spiral track, the tracks being divided into sectors divided by header regions, each sector in a land or groove track has one or more sequences of address pits in the header region preceding said each sector, said sequences of address pits indicating the address of said each sector, said address pits are shifted in a first direction lateral of the land track by half a track pitch (a full track pitch being the distance between the land and groove tracks adjacent to each other) with respect to the track having the sector whose address is indicated by the address pits, so that the center line of the sequences of the address pits is aligned with a boundary between a land track and a groove track following the header, the address pits for a sector in a land track are shifted with respect to the address pits for a sector in a groove track in the direction of the track, so that the they do not overlap in the radial direction, the address pits for sectors in land and groove tracks adjacent to each other are so arranged in the direction of the track that they are scanned by a light spot in the order of a first sequence of address pits for the sector in one of the land track and the groove track, and then a second sequence of address pits for the sector in the other of the land track and the groove track.

With the above configuration, the difference of the tracking error signal obtained when the light spot is scanning the first sequence of address pits and the tracking error signal obtained when the light spot is scanning the second sequence of address pits is used as the offset, and is subtracted from the tracking error signal obtained when the light spot is scanning the data area to produce the tracking error signal free from the offset. The offset thus determined is held until the next header associated with the next sector. Thus, the offset can be determined for each sector and can be corrected or compensated for, and the tracking control can be effected properly even in an optical disk of a single-spiral land/groove configuration in which land tracks and the groove tracks alternate every revolution, and the offset due to eccentricity of the disk, tilting of the disk, error in the mounting of the photodetector, the stray light, the difference in the circuits need to be corrected from one sector to another and between land and tracks.

The optical disk may further comprise a mirror surface part provided following said first and second sequences of address pits in a header at the connecting point.

Provision of the mirror surface following the first and second sequences is advantageous if the first and second sequences of the address pits are used to determine whether the light spot is scanning a header at a connecting point. That is, the tracking error signal can be sampled when the light spot is scanning the mirror surface part after the polarity of the tracking error signal is reversed, the offset after the polarity reversal can be detected by sampling the tracking error signal when the light spot is scanning the mirror surface part. As a result, the offset after the polarity reversal can be removed before starting each revolution of land track or groove track.

It may be so arranged that the length of the mirror surface part, or the disposition of the mirror surface part in a header at the connecting point is different from the length of the mirror surface part, or the disposition of the mirror surface part in a header which is not at a connecting part.

With the above arrangement, whether the header is at a connecting point can be detected based on the length of the mirror surface part, or the disposition of the mirror surface part.

It may be so arranged that the two or more mirror surface parts are provided in at least the headers at a connecting point, or the headers which are not at a connecting point, and the number of the mirror surface parts in a header at the connecting point is different from the number of the mirror surface parts in a header which is not at a connecting part.

With the above arrangement, whether the header is at a connecting point can be detected based on the number of the mirror surface parts.

The optical disk may comprise a flag provided in a header indicating that the header is at a connecting point, or the header precedes a header at a connecting point by a predetermined number of sectors, said flag representing a value different from any of the values of the sector addresses.

With the above arrangement, it is possible to determine whether the light spot is scanning a header which is at a connecting point, or the light spot is approaching a connecting point.

It may be so arranged that the sector address value is incremented according to a known rule, along the spiral.

With the above arrangement, whether the light spot is scanning a header at a connecting point, or the light spot is approaching a connecting point can be determined based on the address value.

Such a determination based on the address value can be employed independently, or as a back-up of other method of determination, such as the one based on the wobbling sequences of address pits, or on the length, the disposition of the mirror surface part, or the number of mirror surface parts, or on the flag.

According to another aspect of the invention, there is provided an optical disk drive device using the optical disk of a single-spiral configuration, in which land tracks and groove tracks are connected at connecting points, occurring every revolution, so that land tracks and groove tracks alternate along a continuous spiral track, the tracks being divided into sectors divided by header regions, each sector in a land or groove track has one or more sequences of address pits in the header region preceding said each sector, said sequences of address pits indicating the address of said each sector, said address pits are shifted in a first direction lateral of the land track by half a track pitch (a full track pitch being the distance between the land and groove tracks adjacent to each other) with respect to the track having the sector whose address is indicated by the address pits, so that the center line of the sequences of the address pits is aligned with a boundary between a land track and a groove track following the header, the address pits for a sector in a land track are shifted with respect to the address pits for a sector in a groove track in the direction of the track, so that the they do not overlap in the radial direction, the address pits for sectors in land and groove tracks adjacent to each other are so arranged in the direction of the track that they are scanned by a light spot in the order of a first sequence of address pits for the sector in one of the land track and the groove track, and then a second sequence of address pits for the sector in the other of the land track and the groove track, said device updating the offset at each connecting point, and comprising:

means for generating a light spot and causing the light spot to scan along the track;

means for generating a tracking error signal on the basis of a light reflected from the light spot on the disk;

means for reversing the polarity of the tracking error signal when the light spot passes a connecting point;

means for removing an offset contained in the tracking error signal, generated when said light spot is passing said first and second sequences of address pits in a header at the connecting point, on the basis of the amount of light reflected from said first and second sequences of address pits; and means for controlling the scanning position of the light spot, responsive to the tracking error signal having the offset removed.

Because the offset at the connecting point can be detected and removed, the effect of the reversal of the offset at the connecting point can be reduced.

As a result, the servo system is not disturbed by the reversal of the tracking error signal, and failure of tracking can be prevented. The recording and reproduction can be achieved without fail even at the data sectors immediately after the connecting point.

It may be so arranged that the optical disk further comprises a mirror surface part provided following said first and second sequences of address pits in a header at the connecting point, and said device performs offset correction using the tracking error signal from the mirror surface part.

With the above arrangement, the signal obtained by sampling the tracking error signal when the light spot is scanning the mirror surface part at the connecting point is held and used for offset correction until the next mirror surface part at the connecting point. That is, the offset value that is sampled and held, is subtracted from the tracking error signal obtained when the light spot is scanning the data area, resulting in a tracking error signal free from the offset.

More specifically, the tracking error signal can be sampled when the light spot is scanning the mirror surface part after the polarity of the tracking error signal is reversed, the offset after the polarity reversal can be detected by sampling the tracking error signal when the light spot is scanning the mirror surface part. As a result, the offset after the polarity reversal can be removed before starting each revolution of land track or groove track.

The tracking error signal obtained when the light spot is passing the mirror surface part contains the offset components due to the shifting of the object lens, the tilting of the disk, and the mounting error of the optical head and photodetector, and stray light.

By subtracting the offset from the tracking error signal during scanning of the data area, the offset is removed, and the effects of the polarity reversal of the offset can be reduced.

Accordingly, the servo system is not disturbed, and failure of tracking can be prevented. The recording and reproduction can be effected can be achieved without fail even at the first data sector after the polarity reversal.

Furthermore, if the mirror surface parts are also provided for the respective sectors where no polarity reversal takes place, the offset inherent to the sensor can also be removed.

Because correct track-following can be achieved with an optical disk of the single-spiral land/groove configuration, continuous data, such as video and audio data, can be recorded and reproduced.

It may be so arranged that the optical disk has the sector address value which is incremented according to a known rule, along the spiral, and said device further comprises means for determining whether the light spot is scanning a header at a connecting point, based on the address values.

With the above arrangement, whether the light spot is scanning a header at a connecting point, or the light spot is approaching a connecting point can be determined based on the address value.

Such a determination based on the address value can be employed independently, or as a back-up of other method of determination, such as the one based on the wobbling sequences of address pits, or on the length, the disposition of the mirror surface part, or the number of mirror surface parts, or on the flag.

The device may further comprise:
a polarity reversing circuit for reversing the polarity of the tracking error signal;
a first offset correction means for correcting offset in the tracking error signal based on the tracking error signal just after the polarity reversal at each connecting point; and
a second offset correcting means for correcting offset in the tracking error signal based on the tracking error signal at each header.

It may be so arranged that
said first offset correction means corrects the offset based on the tracking error signal at the output of the polarity reversing circuit; and
said second offset correcting means corrects the offset based on the tracking error signal at the output of said polarity reversing circuit.

It may be so arranged that the optical disk further comprises a mirror surface part provided following said first and second sequences of address pits in a header at the connecting point, and
said first offset correction means corrects the offset based on the tracking error signal obtained when the light spot is scanning a mirror surface part in a header at a connecting point;
said second offset correction means corrects the offset based on the tracking error signal obtained when the light spot is scanning said first and second sequences of address pits in a header at every sector.

It may be so arranged that
said first offset correction means corrects the offset based on the tracking error signal obtained when the light spot is scanning said first and second sequences of address pits in a header at a connecting point; and
said second offset correction means correct the offset based on the tracking error signal obtained when the light spot is scanning said first and second sequences of address pits in a header at every sector.

It may be so arranged that when the detection of the connecting point based, for instance, on said first and second sequences of address pits or mirror surface part, fails, the offset value obtained at the time of detection of the preceding connecting point continues to be used for the correction.

With the above configuration, even when the detection of offset at a connecting point fails, the offset correction can be continued with the offset value obtained at the preceding connecting point.

The offset removing means may comprise:
a first offset correction means for correcting offset due to reversal of the polarity of the tracking error signal;
a second offset correction means for correcting offset introduced at the tracking error detecting means;
a third offset correcting means for correcting offset introduced in said tracking control circuit;
said first and second offset correction means performing the offset correction during tracking operation, and said third offset correcting means performing the offset correction before the tracking control operation is started.

With the above configuration, the offset due to drift of the tracking control circuit or the like can be removed, so that preciseness of the tracking operation can be further improved.

BRIEF DESCRIPTION OF THE DRAWINGS

FIG. 3A and FIG. 3B show header parts at a connection point between land and groove tracks in an optical disk according to Embodiment 1.

FIG. 7 is a timing chart showing an operation of the optical disk drive device, for detecting the mirror surface part and the wobble pits.

FIG. 8A and FIG. 8B show recognition flags for a sector which are at a connecting point.

FIG. 9A and FIG. 9B show recognition flags for a sector which are not at a connecting point.

FIG. 10 to FIG. 16 show various examples of configuration of header according to Embodiment 2.

FIG. 22A and FIG. 22B show header parts at a connection point between land and groove tracks in the optical disk of FIG. 21.

FIG. 24A and FIG. 24B show examples of configuration of header in the conventional optical disk.

DETAILED DESCRIPTION OF THE PREFERRED EMBODIMENTS

Embodiments of the invention will now be described with reference to the drawings.

Embodiment 1

Figure 1:
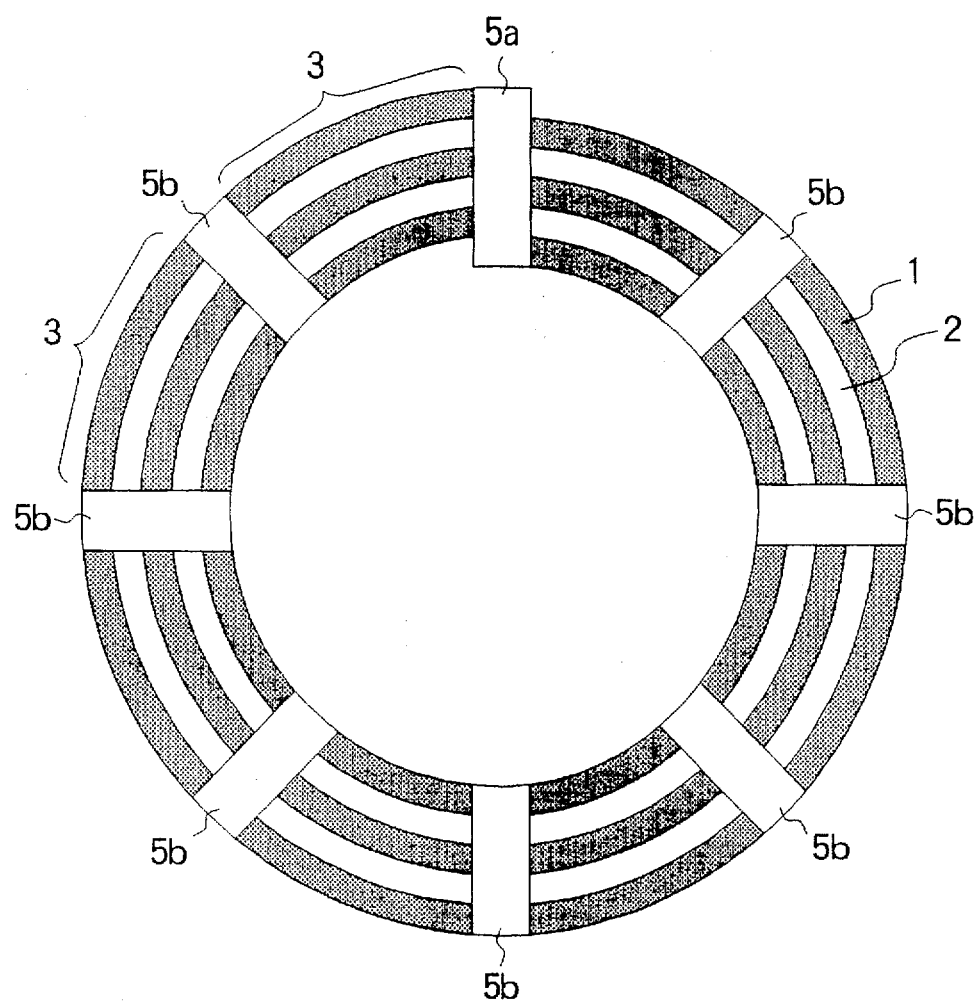
FIG. 1 shows an overall configuration of the land and groove tracks in an optical disk according to Embodiment 1.

The overall configuration of the disk of this embodiment is as shown in FIG. 1. As illustrated, the optical disk is of a single-spiral configuration, in which groove tracks 1 and land tracks 2 are connected at headers 5a forming connecting points, occurring every revolution, so that groove tracks 1 and land tracks 2 alternate along a single continuous spiral track. The tracks are divided into sectors 3 by the header regions 5a, at the connecting points as described above, or header regions 5b which are not at the connecting points. The header in each header region is associated with the sector following the header. In the illustrated example, there are 8 sectors per revolution. In an actual design of an optical disk, there are tens of sectors per revolution.

Figure 2:
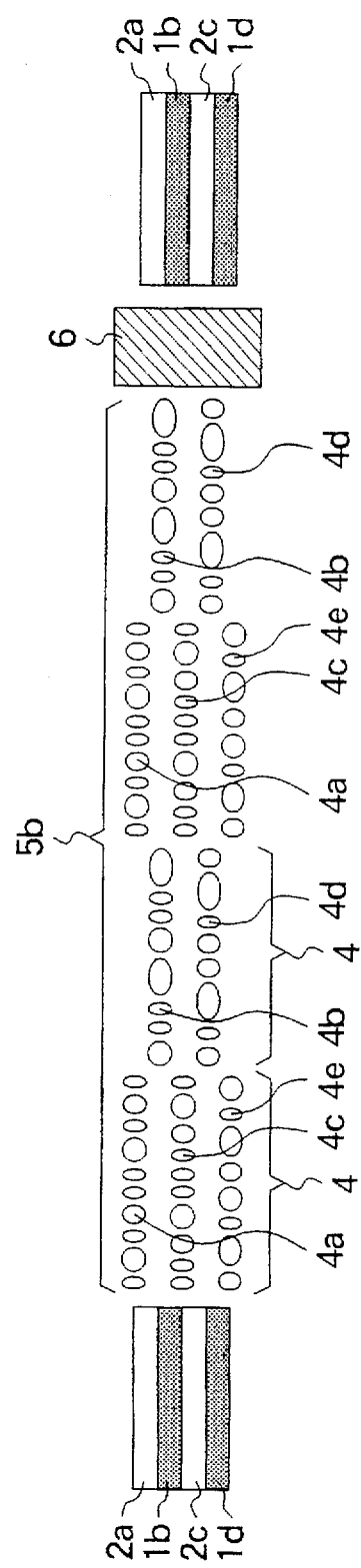
FIG. 2 shows header parts which is not at a connection point between land and groove tracks in an optical disk according to Embodiment 1.

The configuration of the header region 5b at the connecting point in Embodiment 1 is as illustrated in FIG. 2. Specifically, FIG. 2 shows an arrangement of pits in one of the header regions 5b.

As illustrated, a land track (2a, for example) is interrupted by the header region 5b. That is, the land track 2a on one side (e.g., to the left of the header region 5b in FIG. 2) and the land track 2a on the other side (to the right of the header region 5b) are aligned with each other, and the light spot having passed the land track 2a on the left, crosses the header region 5b, and then traces the land track 2a on the right.

The configuration of the header region 5a at the connecting point in Embodiment 1 is as illustrated in FIG. 3A and FIG. 3B. Specifically, FIG. 3A shows an arrangement of pits, and FIG. 3B shows an arrangement of address data.

As illustrated, at the connecting point, a groove track 1z (one of the groove tracks 1, but denoted by 1z for distinction from other groove tracks 1) preceding the header region 5a (to the left of the header region 5a, in FIG. 3A) and a land track 2a following the header region 5a (to the right of the header region 5a, in FIG. 3A) are aligned with each other and is effectively connected. In other words, light spot (not shown) having passed the groove track 1z (on the left) then passes the header region 5a, and then the land track 2a (on the right). Similarly, the light spot having passed the land track 2a (on the left), then passes the header region 5a, and then the groove track 1b (on the right).

Two sets or sequences of address pits 4a in the header region 5a or 5b indicating the address of the sector in the land track 2a following the header region 5a or 5b are shifted in a first direction lateral of the land track 2a, i.e., radially inward (or upward in FIG. 3A) by half a track pitch (a full track pitch being the distance between the land and groove tracks adjacent to each other) with respect to the land track 2a having the sector whose address is indicated by the address pits. Two sequences of address pits 4b in the header region 5a or 5b indicating the address of the sector in the groove track 1b following the header region 5a or 5b are shifted in the same, first direction lateral of the groove track 1b, i.e., radially inward (or upward in FIG. 3A) by half a track pitch with respect to the groove track 1b having the sector whose address is indicated by the address pits. The combination of the sequences of address pits are also called wobble pits, and are used for detecting the tracking error and is used to remove the offset in the tracking error signal, as will be described later. The wobble pits can also be used to determine whether the sector following the wobble pits is in a land track or in a groove track.

The address pits 4b are shifted with respect to the address pits 4a in the direction of the track, so that they do not overlap in the radial direction. More specifically, the address pits 4a and 4b are so arranged in the direction of the track such that they are scanned by the light spot in the order of a sequence of address pits (4a, for example) for the sector in the land track, a sequence of address pits (4b, for example) for the sector in the groove track, a sequences of address pits (4a) for the sector in the land track, and finally second sequence of address pits (4b) for the sector in the groove track.

As a result, in the header region 5a or 5b, the light spot scans the sequence of address pits 4a shifted in the first direction (radially inward, or upward in FIG. 3A), then the sequence of address pits 4b shifted in the second direction (radially outward, or downward in FIG. 3A), then the sequence of address pits 4a shifted in the first direction and finally the sequence of the address pits 4b shifted in the second direction, before scanning a land track (2a, for example). On the other, before scanning a groove track (1b, for example), the light spot scans the sequence of address pits 4c shifted in the second direction, then the sequence of address pits 4b shifted in the first direction, then the sequence of address pits 4c shifted in the second direction and finally the sequence of the address pits 4b shifted in the first direction.

Thus, by detecting the sequence of the direction of shifting of the address pits, i.e., whether it is first, second, first and second directions; or second, first, second and first directions, it is possible to determine whether the track following the header region is a land track, or a groove track. Such detection of the direction of the shifting in the radial direction (lateral direction of the track) can be made on the basis of the tracking error signal.

Because the address pits (4a and 4b, for example) for the sectors on land and groove tracks 2a and 1b adjacent to each other are not overlapped with each other, the pitch of the address pits in the radial direction is twice the track pitch. The address pits may therefore have the same width as the land or groove tracks, so that the address pits can be formed using the same laser beam as that used for forming the land or groove tracks.

The value or contents of the respective sequences of address pits are as shown in FIG. 3B.

In the example shown in FIG. 3B, the same address value (e.g., any of "A," "B," "C," and "D") is repeated twice. That is, the address is duplexed. The same address track (e.g., A) is represented by the address pits shifted in one direction. Different addresses (e.g., "A" and "B") alternate.

A mirror surface part 6 is a part where no lands and grooves are formed. In other words, grooves and lands are interrupted at the mirror part.

At the header regions 5a which are at the connecting points, the polarity of the tracking error signal must be reversed, while at the remaining header regions 5b, such reversal is not required.

Figure 4:
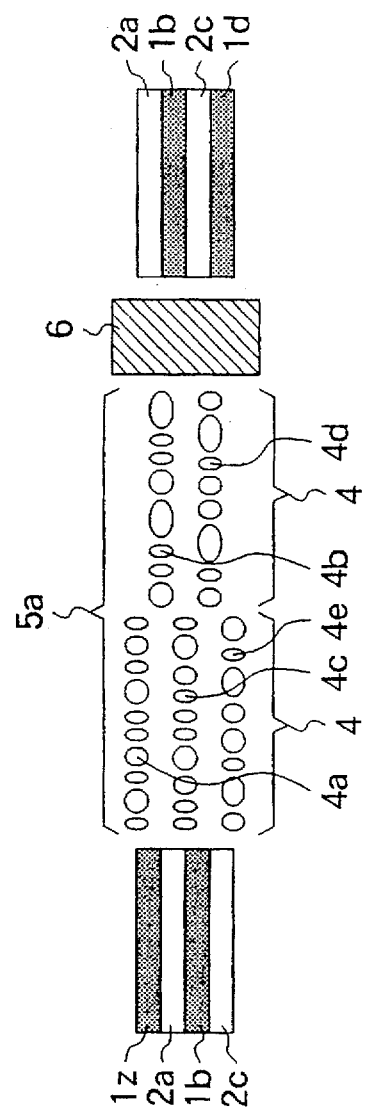
FIG. 4 shows another example of header parts at a connection point between land and groove tracks in an optical disk according to Embodiment 1.

Instead of providing two sequences of address pits for each sector, only one sequence of address pits may be provided as in FIG. 4. In the following description of, for instance, signal processing such as sample-holding, it is sometimes assumed there are only one sequence of address pits, for simplification of explanation. However, the same description is applicable to cases where there are two or more sequences of address pits for each sector, if means are provided to select one of the sequences for the purpose of sampling. As an alternative, sampling may be effected at all the sequences of address pits, and an average or some other combination of the sampled values may be used.

Figure 5:
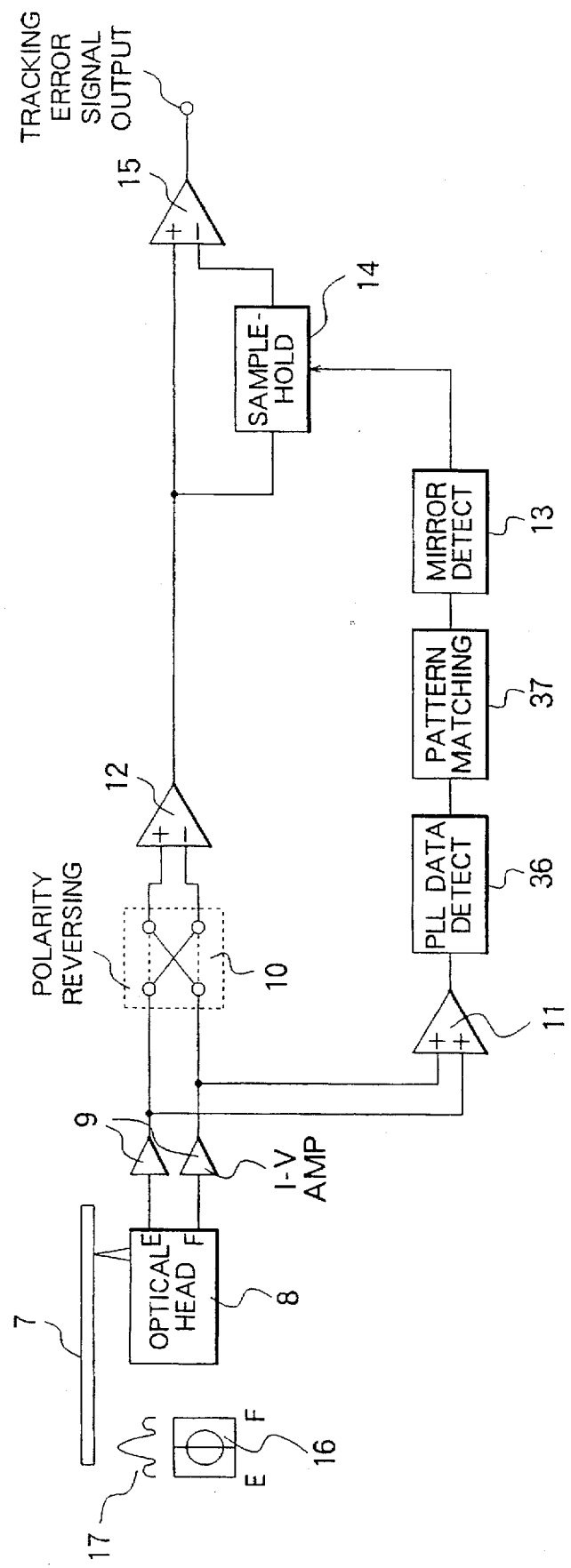
FIG. 5 is a block diagram showing a part of an optical disk drive device concerning the tracking error signal offset correction using mirror surface parts, according to Embodiment 1.

FIG. 5 is a block diagram showing part of an optical disk drive device concerning track offset correction using a mirror surface part.

Light reflected from an on optical disk 7 is received by a tracking sensor 16, in the form of a split photodetector, provided in an optical head 8. The tracking sensor 16 is illustrated outside of the optical head 8, but it is actually within the optical head 8. A typical distribution of light received by the tracking sensor 16 is also illustrated by a curve 17. I–V amplifiers 9 convert the photo-currents output from the respective half portions of the tracking sensor 16, into voltage signals. A polarity reversing circuit 10 reverses the tracking polarity, i.e., the polarity of the tracking error signal. An adding amplifier 11 determines the amount of light reflected from the optical disk 7. A differential amplifier 12 determines the difference of the outputs of the two half portions of the tracking sensor 16, called E and F channels of the tracking sensor 16. A PLL and data detector 36 detects data from the reproduced signal of the address pits or recognition flags. A pattern matching circuit 37 makes recognition of the data. A mirror surface detecting circuit 13 detects the mirror surface part 6 formed on the optical disk 7. A sample-hold circuit 14 samples the tracking error signal when the mirror surface detector 13 detects the mirror surface part, and holds the sampled value until the next sampling. A differential amplifier 15 subtracts the output of the sample-hold circuit 14 from the output of the differential amplifier 12 to remove the offset in the tracking error signal.

Figure 6:
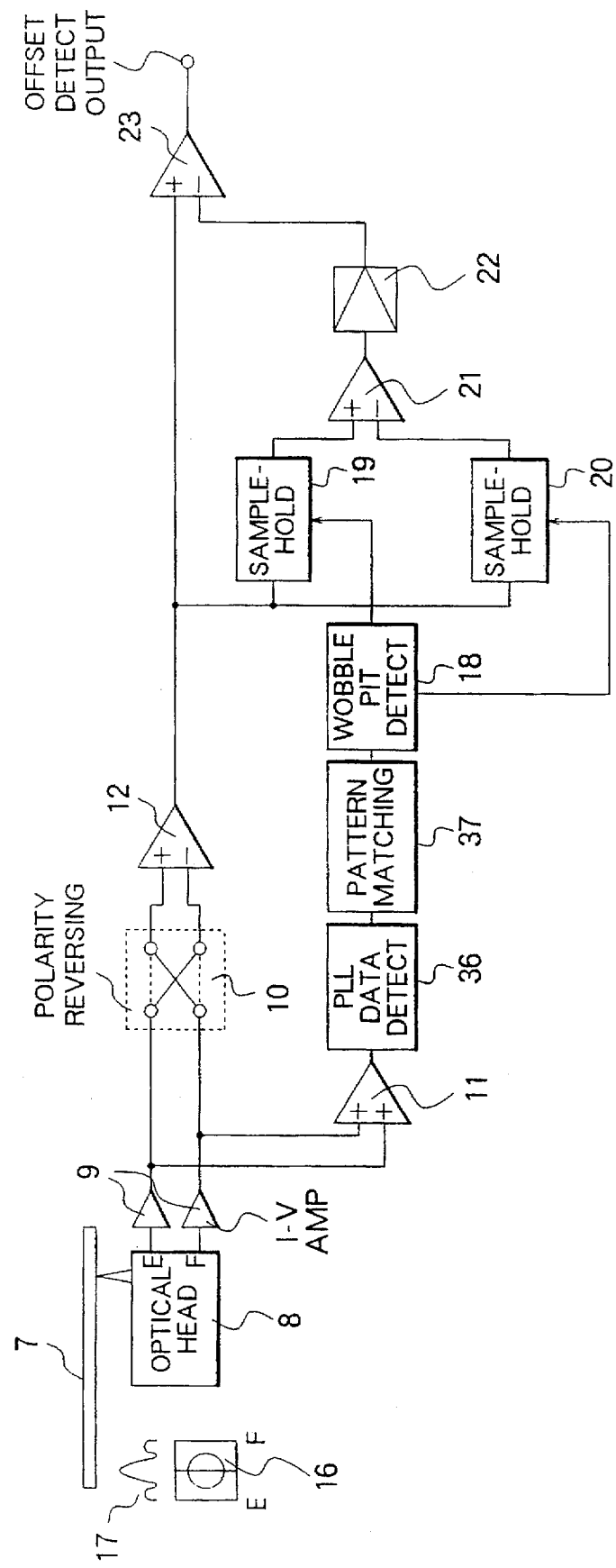
FIG. 6 is a block diagram showing a part of an optical disk drive device concerning the tracking error signal offset correction using wobble pits, according to Embodiment 1.

FIG. 6 is a block diagram of part of the optical disk drive device concerning track offset correction using the sequences of the address pits, also called wobble pits, as described above.

The circuits or members identical to those in FIG. 5 are denoted by identical reference numerals.

A wobble pit detecting circuit 18 detects the sequences of the address pits formed on the optical disk 7. Sample-hold circuits 19 and 20 sample and hold the output of the differential amplifier 12, when the light spot scans the two sequences of address pits shifted in opposite radial directions, and shifted from and adjacent to each other in the circumferential direction. For instance the sample-hold circuits 19 and 20 sample the outputs of the differential amplifier 12 when the light spot scan the sequences of the address pits that appear first and second during the scanning in the header. More specifically, when the wobble pit detecting circuit 18 produces a first signal when it detects a selected one of sequences of address pits shifted in the first direction (which may appear first or second), and produces a second signal when it detects a selected one of the sequences of address pits shifted in the second direction (which may appear second or first). The sample-hold circuit 19 samples the output of the differential amplifier 12 when the wobble pit detecting circuit 18 produces the first signal, and holds the sample signal until the next sampling. The sample-hold circuit 20 samples the output of the differential amplifier 12 when the wobble pit detecting circuit 18 produces the second signal, and holds the sample signal until the next sampling.

A differential amplifier 21 determines the difference between the outputs of the sample-hole circuits 19 and 20. A gain amplifier 22 amplifies the output of the differential amplifier 21. Another differential amplifier 22 subtracts the output of the gain amplifier 22 from the output of the differential amplifier 12 to remove the offset from the original tracking error signal.

FIG. 7 shows the timings at which the mirror surface part and the wobble pits are detected in the optical disk drive device of Embodiment 1. It is assumed that only one sequence of address pits is provided for each sector, as illustrated in FIG. 4. However, even if there are two (or more) sequences of address pits, one of the sequences may be selected, by means of an appropriate timing detection circuit, and used in the same manner. Reference numeral 24 denotes a reproduced sum signal, 25 denotes a reproduced address signal obtained by wave-form shaping the reproduced sum signal (by a waveform shaping circuit, which is not shown, but is provided between the adder 11 and the PLL and data detecting circuit 36). Reference numeral 26 denotes a clock generated by a PLL and data detecting circuit 36 for extracting data of the reproduced address signal. Reference numeral 27 denotes a pattern matching signal of address A produced by the pattern matching circuit 37. Reference numeral 28 denotes a pattern matching signal of address B produced by the pattern matching circuit 37. Reference numerals 29 and 30 denote timings for sampling the wobble pits. Reference numeral 31 denotes a timing for sampling the mirror surface part.

In the conventional optical disk with spiral grooves or lands, each revolution of a groove is connected to another revolution of a groove, and similarly each revolution of a land is connected to another revolution of a land. Accordingly, two spirals, one made up solely of a land, and another made up solely of a groove are present. In an optical disk in which a single continuous information track is formed, land tracks and groove tracks are connected together every revolution, with a land track and groove track alternating every revolution along the track. In the optical disk shown in FIG. 1, data is recorded along a single spiral track, as in a compact disk (CD). The manner of the track jump may the identical to that performed on CD's.

The conventional spiral track optical disk requires a special track jump, such as a jump from the tail end (outer end) of the land track to the leading end (inner end) of the groove jump. At such a part, the recording density is abruptly lowered. On the other hand, when tracks are formed by a mastering device, it is sufficient if a simple spiral is traced. In contrast, with the optical disk shown in FIG. 1, laser beam must be shifted in the radial direction by a track pitch every revolution. A more serious problem is that the tracking error signal polarity must be reversed every revolution. Particular problems are the occurrence of offset in the tracking error signal, and reversal of the polarity of certain components of the offset at the time of reversal of the tracking error signal.

Methods of removing offset include a correction method using a mirror surface part, and a correction method using wobble pits. In a conventional optical disk capable of recording and reproduction, header parts are formed in parts of the disk where no grooves are provided, and sector address and other information are pre-recorded in the form of embossed pits. In the case of land/groove recording, if the embossed pits are configured as shown in FIG. 3A and FIG. 3B, (and FIG. 2, or FIG. 4) the address pits themselves can be utilized as wobble pits.

In the case of the conventional address pit configuration shown in FIG. 22A, a laser beam used for the formation of the prepits must be different from the laser beam used for forming the tracks, and the fabrication of the medium is therefore difficult. Moreover, the laser beam must be shifted in units of a track pitch (being defined as a distance between the center of a groove track to the center of an adjacent land track) and the fabrication of the medium is therefore difficult. Moreover, in the case of the configuration of FIG. 22B, the same address is reproduced for the land and groove adjacent to each other. It is therefore not possible to determine from the reproduced address alone whether the light spot is scanning a land or a groove.

In contrast, in the case of the optical disk shown in FIG. 3A and FIG. 3B, (and FIG. 2, or FIG. 4), when the groove tracks are formed, the address pits are also formed using the same laser beam, being shifted by half a track pitch (by half a track pitch in one direction (e.g., radially outward) and then by half a track pitch in the other direction (e.g., radially inward). As a result, the fabrication of the disk is easy.

An advantage of the configuration shown in FIG. 3A and FIG. 3B (and FIG. 2, or FIG. 4) is that so each track can be identified from the reproduced address information alone. For instance, for reproducing a land track $2a$, the addresses are reproduced in the order of address A, address B, address A and then address B. When reproducing the adjacent groove track $1b$, the addresses are reproduced in the order of address C, address B, address C and then address B. If, for instance, the address value is incremented in the order of scanning along the spiral, there is a relationship for instance.

$$A<B<C$$

If the value of the address read first is smaller than the value of the address read later (as in the case when the addresses read are in the order of A, B, A and B, then the sector following the header is in a land track. If the value of the address read first is larger than the value of the address read later (as in the case when the addresses read are in the order of C, B, C and B), then the sector following the header is in a groove track. Thus, on the basis of the relationship between the values of the addresses read in turn, whether the next sector is in a groove track or in a land track can be determined.

It is also possible to determine whether the sector following the header is in a groove track or a land track on the basis of the tracking error signal as read while the light spot is scanning the sequences of the address pits, as described before.

The address pits are disposed alternately as wobble pits, and in addition, a mirror surface part 6 is also provided. It is therefore possible to remove unnecessary offset due to shift of the optical head or tilting of the disk, in particular that associated with the push-pull sensor method, as described in connection with the prior art example.

However, what is particularly problematical is that the polarity of the tracking error signal must be switched at the header $5a$ which appears once a revolution, as shown in FIG. 1. The tracking error signal $\Delta T$ immediately before a servo compensation circuit (such as one formed of the circuits 51, 52, 53, 54 and 55 in FIG. 20, to be later described), obtained in a push-pull method is given by the following equation:

$$\Delta T = \Delta Ts + \Delta Tg + \delta + \Delta Tt + \Delta Ti + \Delta Th \quad (2)$$

where
$\Delta Ts$ is a true tracking error signal;
$\Delta Tg$ is an offset due to the shift of the objective lens;
$\delta$ is an offset due to the tilting of the disk;
$\Delta Tt$ is an offset due to mounting error of the optical detector and stray light in the optical head;
$\Delta Ti$ is an offset from the detector to the polarity reversing circuit; and
$\Delta Th$ is an offset from the polarity reversing circuit to the compensation circuit in a servo system.

The polarity of the true tracking error signal $\Delta Ts$ is reversed each time the track is changed from a land to a groove, or from a groove to a land. By reversing the polarity by the polarity reversing circuit 10, a correct tracking error signal can be obtained. Thus, the tracking error polarity reversal does no produce any problem with regard to $\Delta Ts$. On the other hand, the offset $\Delta Tg$ due to the shift of the lens and the offset $\delta$ due to the tiling of the disk occur independently of whether the light spot is scanning a land or a groove. If the polarity of the tracking error signal were reversed without taking the above in consideration, the reverse offset would be applied. It is thus necessary to alter or update the amount of correction for the offset components $\Delta Tg$ and $\delta$ obtained by the wobble pit method or mirror surface method.

In a method using $\Delta Tg$ calculated from the objective lens position sensor of the optical head, or a method for correcting after storing $\Delta Tg$ in a memory for one revolution of the track prior to tracking operation, correction will be made without reversing the polarity of $\Delta Tg$ at the time of tracking error signal polarity reversal.

With regard to $\Delta Tt$ and $\Delta Ti$, it is sufficient if the amounts of correction are determined before the device is used for operation, or when the device is shipped from the manufacturer, so that these offsets as well as $\Delta Th$, are in many cases, corrected by the offset adjustment and the like of the servo circuit. However, while the polarities of $\Delta Tt$ and $\Delta Ti$ are reversed at the time of tracking error signal polarity reversal, $\Delta Th$ is not reversed. As a result, offset errors having the same magnitude as and having an opposite polarity to $\Delta Tt$ and $\Delta Ti$ may be created. For this reason, as shown in FIG. 5, a sample-hold circuit 14 is provided at the back of the polarity reversing circuit 10 to sample and hold the tracking error signal at the time when the light spot passes the mirror surface part 6, and on the basis of the output of the sample-hold circuit 14, the original tracking error signal (tracking error signal as output from the differential amplifier 12) is corrected by the differential amplifier 15. In this way, the correction of the offset, including $\Delta Tt$ and $\Delta Ti$ can be achieved.

In the correction in the mirror surface method, $\Delta Tg$ and $\delta$ are also reversed by the polarity reversing circuit, so that it is necessary to correct them, after the tracking error signal polarity reversal, by the sample-hold circuit 14 in FIG. 5.

In this method in particular, the correction means needs to be provided in a stage subsequent to the polarity reversing circuit 10, and by this arrangement $\Delta Tt$ and $\Delta Ti$ which are offsets at the time of the tracking error signal polarity reversal can be corrected. If the polarity reversing circuit were disposed after the correction means, then, at the time of the tracking error signal polarity reversal, $\Delta Tt$ and $\Delta Ti$ in the opposite direction would be created, and the correction would become meaningless. Moreover, for the correction at the time of the tracking error signal polarity reversal, the polarity reversing circuit 10 must be switched to the reverse side before causing the sample-hold circuit 14 to operate, to effect the correction.

The above described correction is shown in FIG. 7. As illustrated, the address pits are reproduced by the PLL and data detecting circuit 36, and the pattern matching signal 27 is generated by the pattern matching circuit 37, on the basis of the reproduced signal 25, and the polarity reversing circuit 10 is reversed in accordance with this signal. Then, responsive to the sample-hold timing signal 31 generated on the basis of the pattern matching signals 27 and 28, the tracking error signal at the time of the passage of the mirror surface is sampled and held.

The address pits are configured, after having been converted into a pattern which is not used for normal recording data. Accordingly, by matching this pattern in a digital circuit (in the pattern matching circuit 37), the pattern detection timing can be obtained, and together with the clock signal, the detection timing of the mirror surface can be obtained.

In this method, however, it is necessary to completely correct ΔTt and ΔTi at the differential amplifier 15. An offset adjustment means generally configured in a servo circuit in a subsequent stage needs to be so adjusted that ΔTt and ΔTi are not contained. Accordingly, in the offset adjustment of this method, the offset generated by the tracking error signal polarity reversal is corrected so that the voltage level after the correction will be zero or a predefined reference voltage, by means of the differential amplifier 15, and at the offset correction means in the servo circuit in the subsequent stage, only the deviation from the above-mentioned predefined voltage, due to the circuits, is corrected. In this case, the correction at the time of the tracking error signal polarity reversal is conducted when the light spot passes the mirror surface, so that the offset component alone is adjusted to be the predefined voltage, irrespective of the tracking error component.

When the adjustment at the time of tracking error signal polarity reversal is made using the wobble pits, the configuration shown in FIG. 6 is used. In this case, in the same way as the conventional method of detection of the sensor offset using wobble pits, the sum signal indicative of the amount of reflected light from the disk and incident on the photodetector 16 of the optical head 8 is produced by the summing amplifier 11, and the PLL and data detecting circuit 36, the pattern matching circuit 37 and the wobble pit detecting circuit 18 detect the wobble pits, and produce a wobble pit detection timing signal. Responsive to this wobble pit detection timing signal, the sample-hold circuits 19 and 20 sample the output of the differential amplifier 12 during passage of the wobble pits, i.e., the two sequences of laterally shifted address pits. The difference between the outputs of the sample-hold circuits 19 and 20 is determined by the differential amplifier 21, so as to obtain a tracking error signal free from offset. This tracking error signal free from offset error is applied to the amplifier 22, where it is multiplied with a predefined gain. A difference between the output of the amplifier 22 (tracking error signal free from offset error) and the original tracking error signal is determined at the differential amplifier 23, so that the offset contained in the original tracking error signal is obtained.

Figure 27:
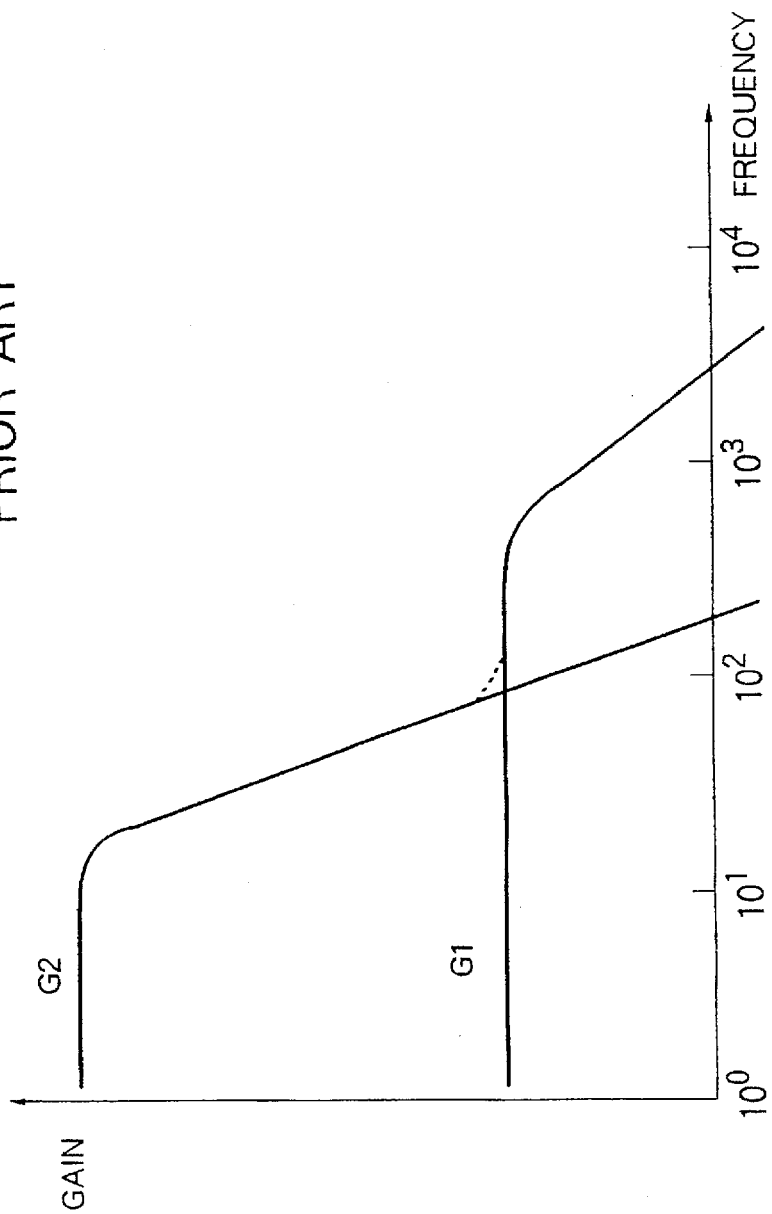
FIG. 27 shows control characteristics of the conventional optical disk drive using wobble pits and push-puss method.
Figure 28:
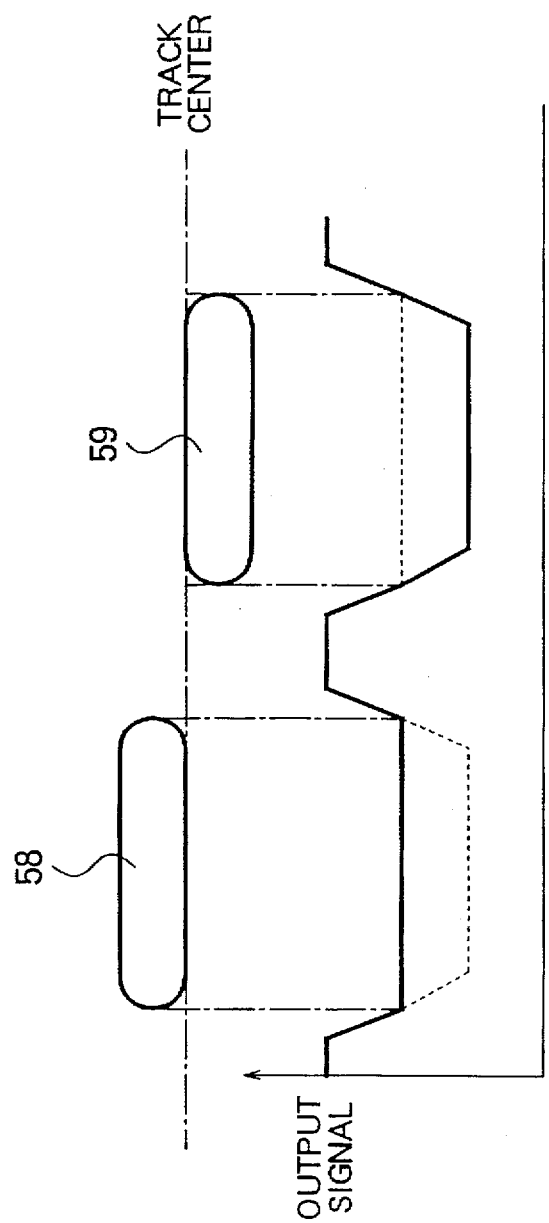
FIG. 28 shows waveforms of the outputs obtained from the wobble pits.

The amplifier 22 is provided to adjust the difference in the gain between the tracking error signal obtained from the wobble pits, and the tracking error obtained by the push-pull method. The offset signal thus obtained is subtracted at a differential amplifier, not shown, but is similar to the differential amplifier 15 in FIG. 5, from the tracking error signal for correction, as in the mirror surface correction. In the conventional wobble pit correction method, the correction is achieved through feedback, as shown in FIG. 27. In contrast, according to the present embodiment, the correction is equivalent to feed-forward correction operation. This is advantageous because the offset signal varies abruptly at the time of tracking error signal polarity reversal, and in such a situation, feedback correction is not quick enough and may disturb the servo system.

Embodiment 2

The above-described correction at the time of tracking error signal polarity reversal must be effected after confirming that the sector following the header region in question is at a connecting point and the tracking error signal polarity is to be reversed at the sector. If an erroneous address information were read, due to a scratch on the optical disk, and unnecessary tracking error signal polarity reversal were effected, tracking might fail. Whether or not the header region is at the connecting point must therefore be detected without fail. In Embodiment 1, if the data area is divided into radial zones and the number of sectors per revolution is constant throughout each zone, then by reading the address of the optical disk, whether or not the header region is at the connecting point can be detected from the arrangement of the sector numbers within the zone. For instance, let us assume that the number of sectors per revolution in a particular zone is m, and the address number "0," indicates the sector at (or next to the header region at) the first connecting point within the zone. Tracking error signal polarity reversal is effected at each of the sectors designated by a sector address equal to m×n (n being an integer). Accordingly, by detecting and decoding the sector address, whether the header being scanned is at a connecting point can be detected.

However, in such a method of reading the contents of the address pits, it is possible that the polarity connecting point is erroneously detected because of misreading during data reproduction. Even if the address of sector at the connecting point is not detected, the address value is incremented one by one, so that by reading the address at an immediately preceding sector or a sector preceding by a known number of sectors, it is possible to predict the address of the sector where the connecting point is present, and/or to correct the errors in the address data reading.

However, at the time of the first tracking pull-in, or pull-in after a track access, it is necessary to make the judgment as to whether the header region is at the connecting point solely in accordance with information obtained at the header region in question. There is therefore a similar problem.

For this reason, dedicated recognition flags which indicate whether the header region is at a connecting point may be provided, separate from the address for data reproduction, as shown in FIG. 8A, FIG. 8B, FIG. 9A and FIG. 9B. The recognition flags 32 and 33 shown in FIG. 8A and FIG. 8B indicate that the header region is at a connecting point, while the recognition flags 34 and 35 shown in FIG. 9A and FIG. 9B indicate that the header region is not at the connecting point. By such provision of the recognition flag, reading error can be reduced, and whether or not the header region is at a connecting point can be detected made without fail. The recognition flags 32 and 34 shown in FIG. 8A and FIG. 9A are formed for each track. The recognition flag 34 shown in FIG. 9A has a pattern different from a pattern of the recognition flag 32 shown in FIG. 8A. The recognition flags 33 and 35 in FIG. 8B and FIG. 9B are formed of pits elongated in the radial direction. The recognition flag 35 shown in FIG. 9B is different from a pattern of the recognition flag 33 shown in FIG. 8B.

Because the recognition flags are provided at the center of the track or are elongated in the radial direction (longer than address pits) so that whether the header region is at a connecting point can be detected without fail, during scanning through the lands or grooves. Moreover, the recognition flags are made to have patterns which do not result from the modulation of the address (for the address pits) or record data, so that judgment as to whether the detected signal represents a recognition flag can be made.

As an alternative to the provision of the recognition flags, the position of the mirror surface parts, the number of the mirror surface parts and/or the presence and absence of a mirror surface part may be altered to indicate whether or not the header region is at a connecting point. FIG. 10 to FIG. 16 show examples of header configurations to indicate whether or not the header region is at a connecting point. FIG. 10 shows the configuration where no mirror surface part is provided. In FIG. 11, a mirror surface part is be provided (at the tail part of the header). In FIG. 12, two mirror surface parts are provided. In FIG. 13, four mirror surface parts are provided. In FIG. 14, a mirror surface part is provided in the middle of the header. In FIG. 15, a long mirror surface part is provided in the middle of the header. In FIG. 16, a long mirror surface part is provided at the tail part of the header. Any combination of two of these different configurations may be used to indicate whether the header region is at the connection point. For instance, the configuration of FIG. 10 may be used to indicate a sector at the connecting point, while the configuration of FIG. 11 (or any of FIG. 12 to FIG. 16) may be used to indicate a sector which are not at a connecting point. Alternatively, the configuration of FIG. 11 may be used to indicate a sector which is not at a connecting point, while any of the configurations of FIG. 12 (or any of FIG. 13 to FIG. 16, or FIG. 10) may be used to indicate a sector at a connecting point. In either case, whether the header region is at a connecting point can be detected from the variation in the reproduced signal, so that it is not necessary to detect the contents of the address or the recognition flags for finding whether the header region is at a connecting point.

In addition to the detection of the recognition flags and arrangement and/or presence or absence of the mirror surface parts, the address data read from the address pits may also be taken account of, in determining the header region is at a connecting point. This will further improves the reliability of the judgment as to whether the header region is at a connecting point.

Furthermore, the header parts for the sectors within each zone are aligned with each other in the radial direction, so that, by measuring the rotation angle of the disk motor on the basis of an output of a rotary encoder attached to the disk motor or the time interval between succeeding connecting points (the time taken for each revolution), the timing at which the connecting point will appear can be predicted on the basis of any of these measured values. However, the prediction of the timing may be associated with errors, so that the prediction is used in combination with the reading of the address, or detection of the recognition flag, to improve the reliability of the detection of the connecting point.

Embodiment 3

In Embodiment 1, offset correction is performed only on the basis of the tracking signal sampled when the light spot is scanning the header for each sector. A problem encountered by such a circuitry is that if the detection of the connecting point (specifically, on the basis of the mirror surface part, wobble pits or recognition flag in the header at the connecting point, as shown in connection with Embodiment 2) fails due to a scratch on a disk, the offset correction at the time of the polarity reversal (at the connecting point) is not effected. Although as detection of the connecting point may be made on the basis of the address values, or the output of the rotary encoder, a back-up scheme, if detection of the recognition flags 32 and 33, or wobble pits 4 fail, correction of offset cannot be effected, and the servo operation is disturbed because of the offset, and the recording and reproduction of the signals cannot be effected accurately.

Figure 17:
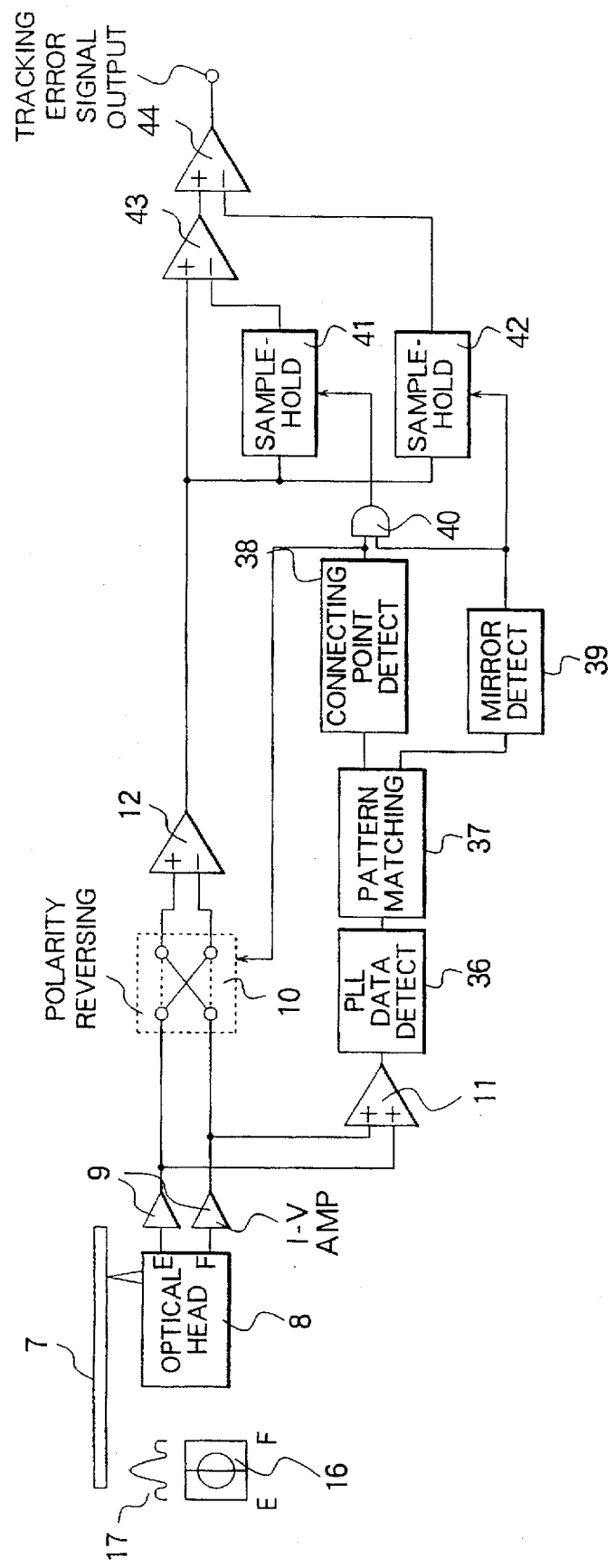
FIG. 17 is a block diagram showing a part of an optical disk drive device concerning the tracking error signal offset correction using mirror surface parts, including correction at a connecting point, according to Embodiment 2.

To overcome the above problem, a dedicated sample-hold circuit 41 for correction at the connecting point may be provided, as shown in FIG. 17.

FIG. 17 shows a circuit for offset correction of a tracking error signal at the connecting point in Embodiment 3. A PLL and data detector 36 detects data from the reproduced signal of the address pits or recognition flags. A pattern matching circuit 37 makes recognition of the data. A connecting point detection circuit 38 detects whether the header region is at a connecting point, and produce a signal which is active at a connecting point. A mirror surface detection circuit 39 detects obtains the timing of detection of the mirror surface, and produce a signal which is active at the timing of the detection of the mirror surface. An AND circuit 40 outputs a signal which is active when the outputs of the connecting point detection circuit 38 and the mirror surface detection circuit 39 are both active. A sample-hold circuit 41 holds the offset value of the tracking error signal at a sector at a connecting point. A sample-hold circuit 42 holds the offset value at normal sectors, i.e., sectors which are not at a connecting point. A differential 43 subtracts the output of the sample-hold circuit 41 from the output of the differential amplifier 12 to remove the offset due to the tracking error signal polarity reversal. Another differential amplifier 44 subtracts the output of the sample-hold circuit 42 from the output of the differential amplifier 43 to remove the offset due to the shift of the objective lens or tilting of the disk in the normal sectors.

Figure 18:
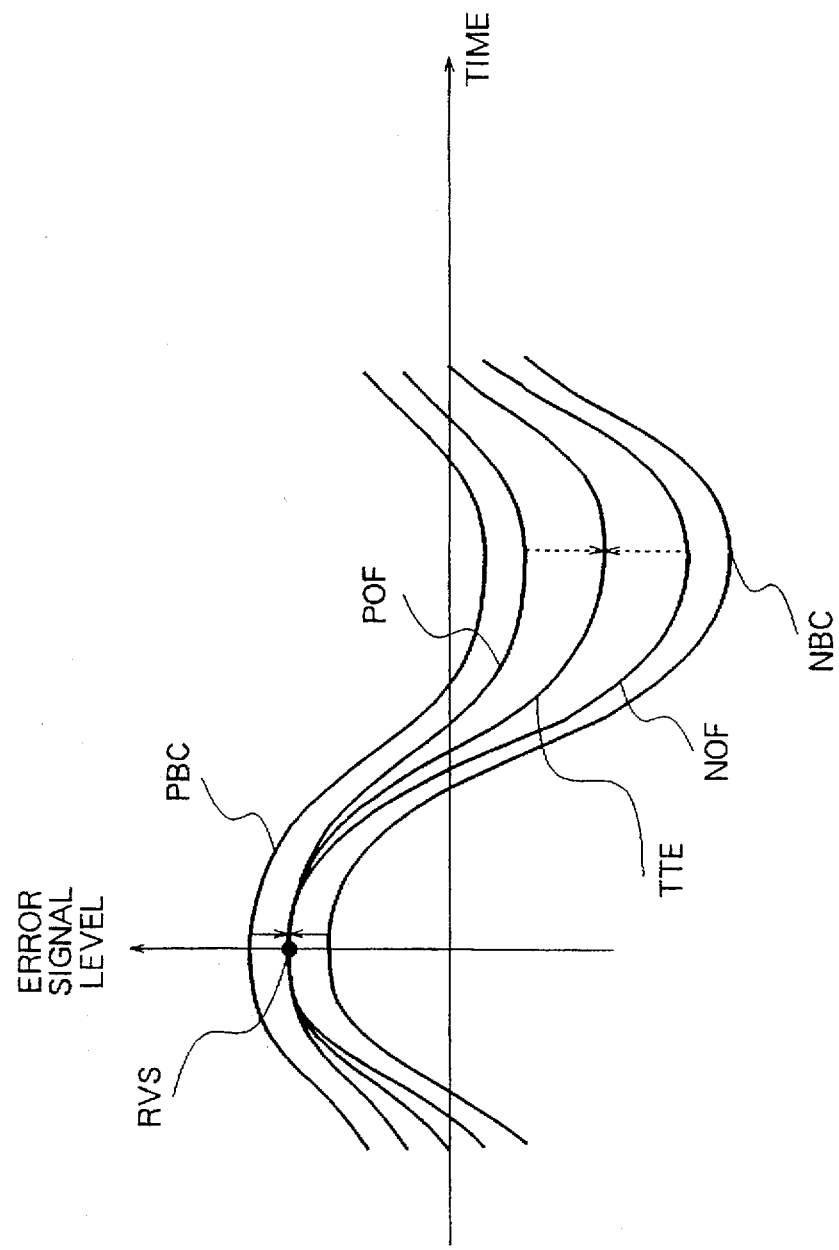
FIG. 18 is a diagram showing the signals before and after the correction.

FIG. 18 a diagram showing a tracking error signals (in a state in which tracking is achieved or maintained) before and after the correction. The error signal without correction may be indicated by PBC (before positive mirror surface correction) in the drawing, and is deviated substantially from the true tracking error signal (TTE). At the connecting point (RVS), the tracking error signal polarity is reversed, so that the tracking error signal will become as indicated by NBC (before negative mirror surface correction). This is also deviated substantially. When correction is made by means of the sample hold circuit 41 and the differential amplifier 43, on the basis of the tracking error signal at the connecting point, the resultant signal is like that indicated by those indicated by POF (with positive offset) or NOF (with negative offset). By the correction made by the sample-hold circuit 42 and the differential amplifier 44 on the basis of the tracking error signal at every sector, the resultant signal is like that shown by the TTE (true tracking error). In other words, the circuits 41 and 43 serve to reduce the error from the curves PBC to POF, or from NBC to NOF, while the circuits 42 and 44 serve to reduced the error from the curves POF to TTE, or NOF to TTE.

Figure 19:
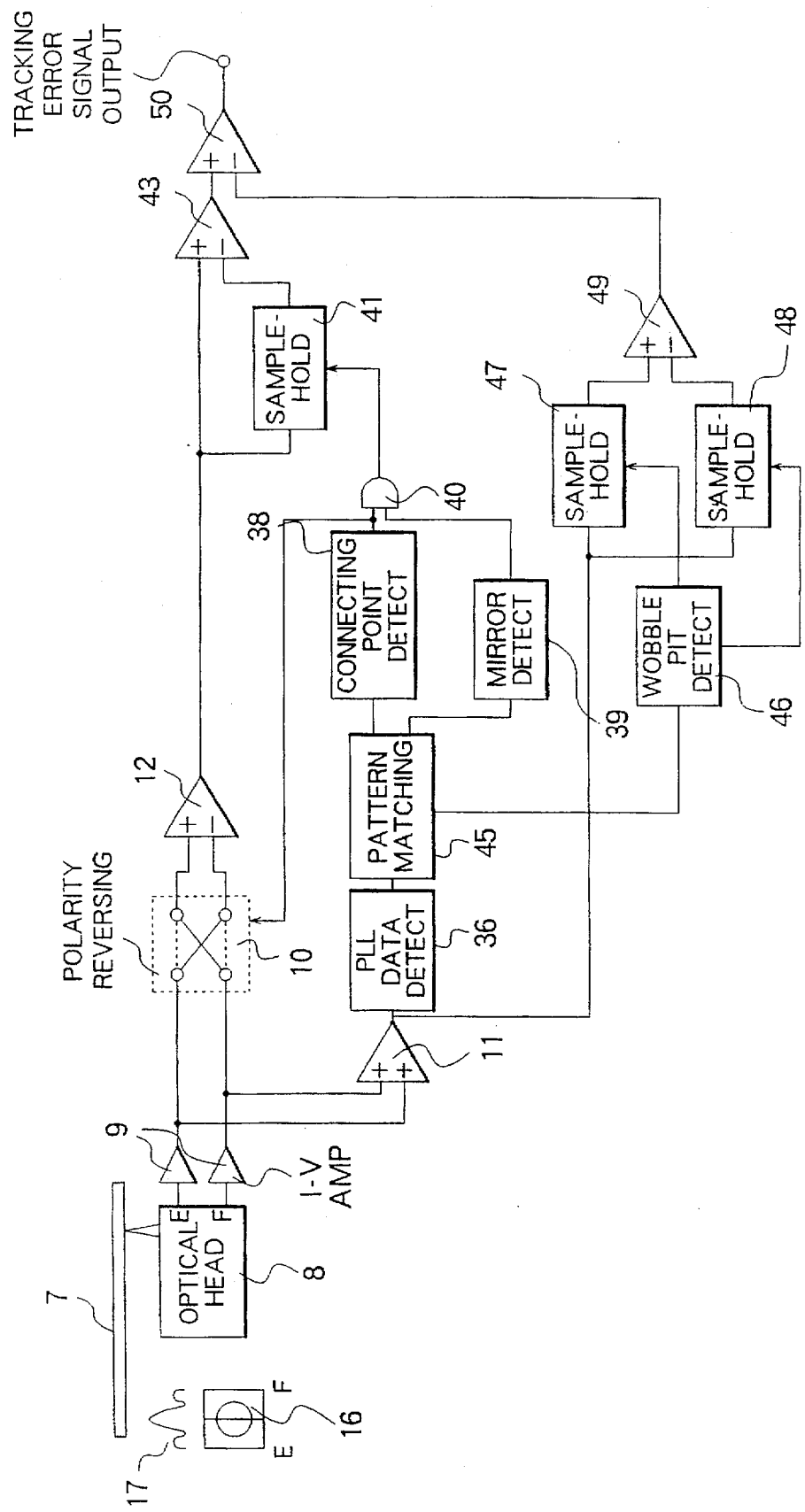
FIG. 19 is a block diagram showing a part of an optical disk drive device concerning the tracking error signal offset correction using mirror surface parts and wobble pits, including correction at a connecting point, according to Embodiment 3.

FIG. 19 is a block diagram showing another circuit according to Embodiment 3, which performs correction of offset due to tracking error signal polarity reversal, and uses wobble pits to correct sensor offset which occurs in a conventional push-pull method. A pattern matching circuit 45 is capable of pattern matching including pattern matching of the wobble pits. A wobble pit detecting circuit 46 produces a signal which becomes active at the timing of detection of the wobble pits, specifically the sequence of address pits deviated to a first side (upper side in FIG. 3A for example) and the sequence of address pits deviated on a second side (lower side in FIG. 3A for example). A sample-hold circuit 47 holds the sum signal (from the adder 11) at the time of detection of the sequence of address pits deviated on the first side (upper side in FIG. 3A, for example). Another sample-hold circuit 48 holds the sum signal (which is supplied from the adder 11 and which indicates the amount of reflected light) at the time of detection of the sequence of address pits deviated on the second side (lower side in FIG. 3A, for example). A differential amplifier 49 determines the difference between the outputs of the sample-hold circuits 47 and 48. An adder 50 adds the tracking error signal generated from the address pits to the original tracking signal.

Figure 20:
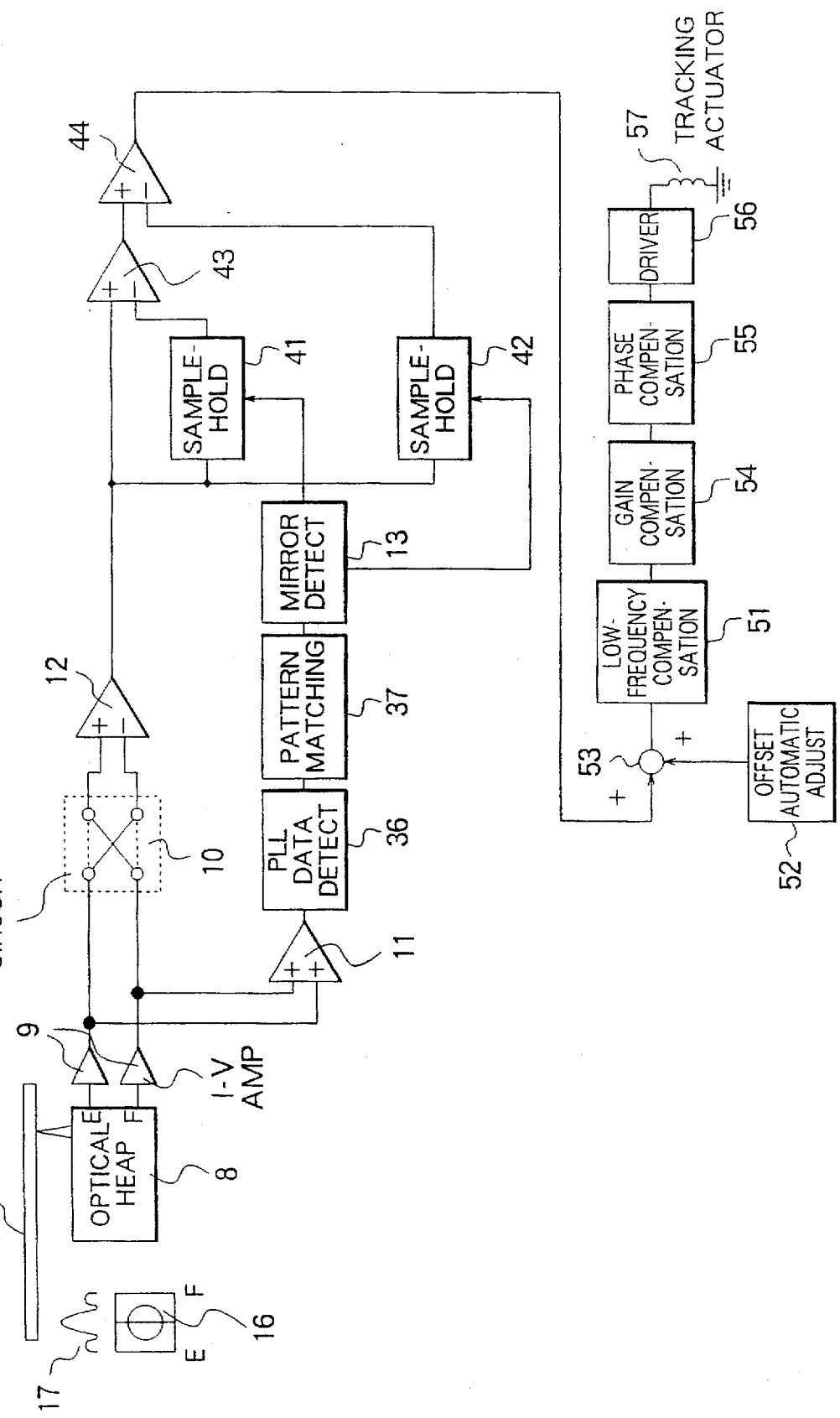
FIG. 20 is a block diagram showing a part of an optical disk drive device concerning the tracking error signal offset correction using mirror surface parts, including correction at a connecting point, sensor offset, and correction of offset generated in the servo circuits.
Figure 21:
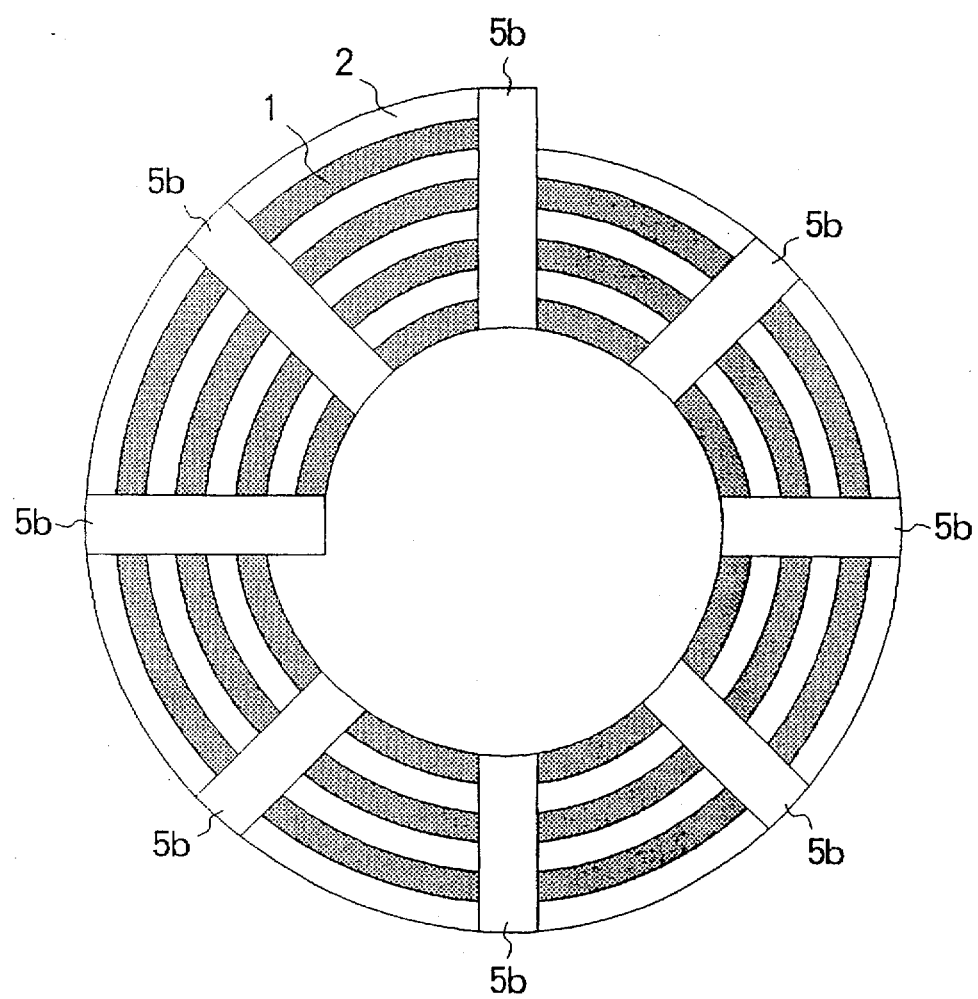
FIG. 21 shows an overall configuration of the land and groove tracks in a conventional optical disk.
Figure 23:
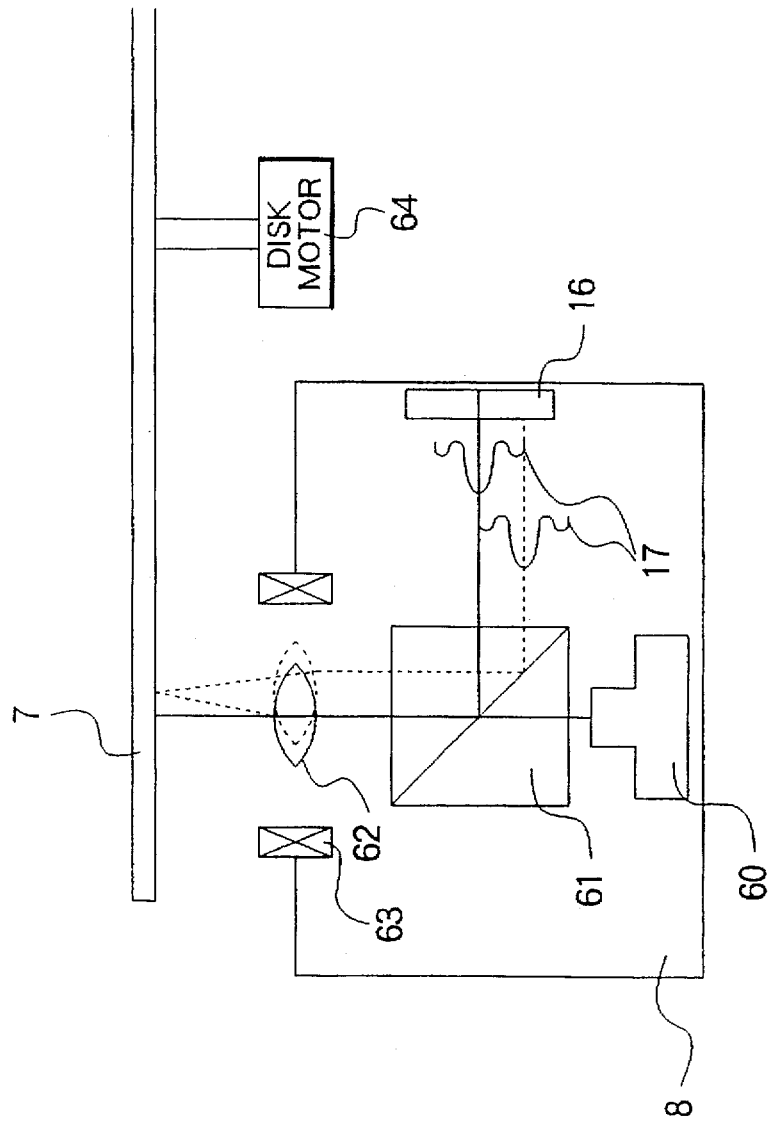
FIG. 23 shows how the offset is generated in the optical head.
Figure 25:
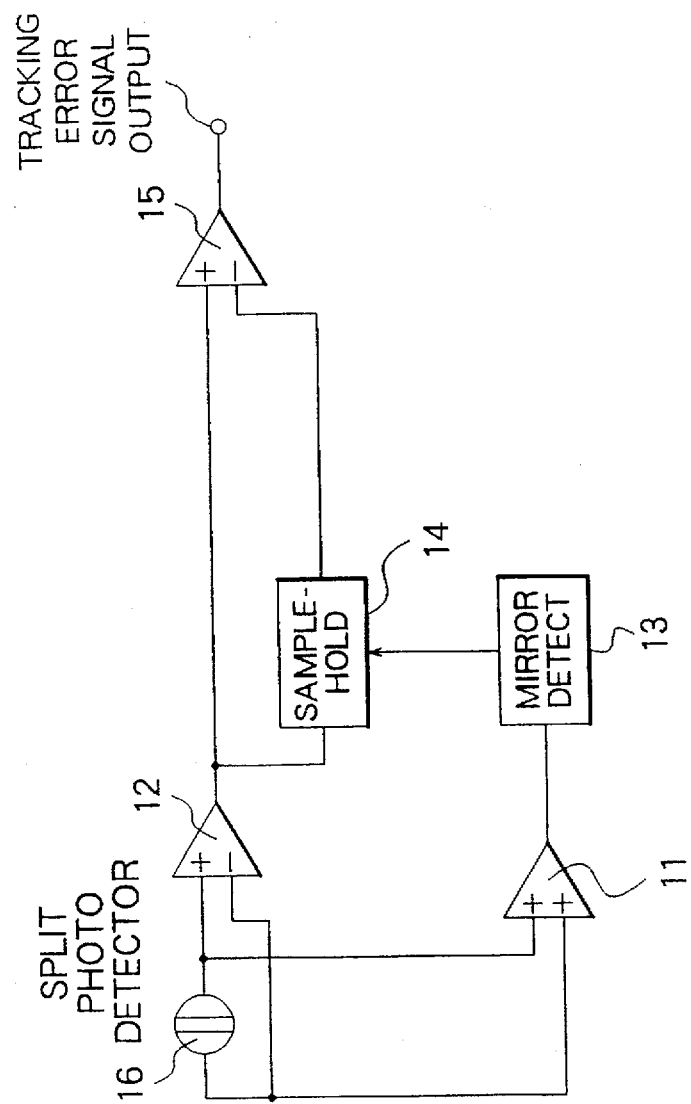
FIG. 25 is a block diagram showing a part of a conventional optical disk drive device concerning the tracking error signal offset correction using mirror surface parts.
Figure 26:
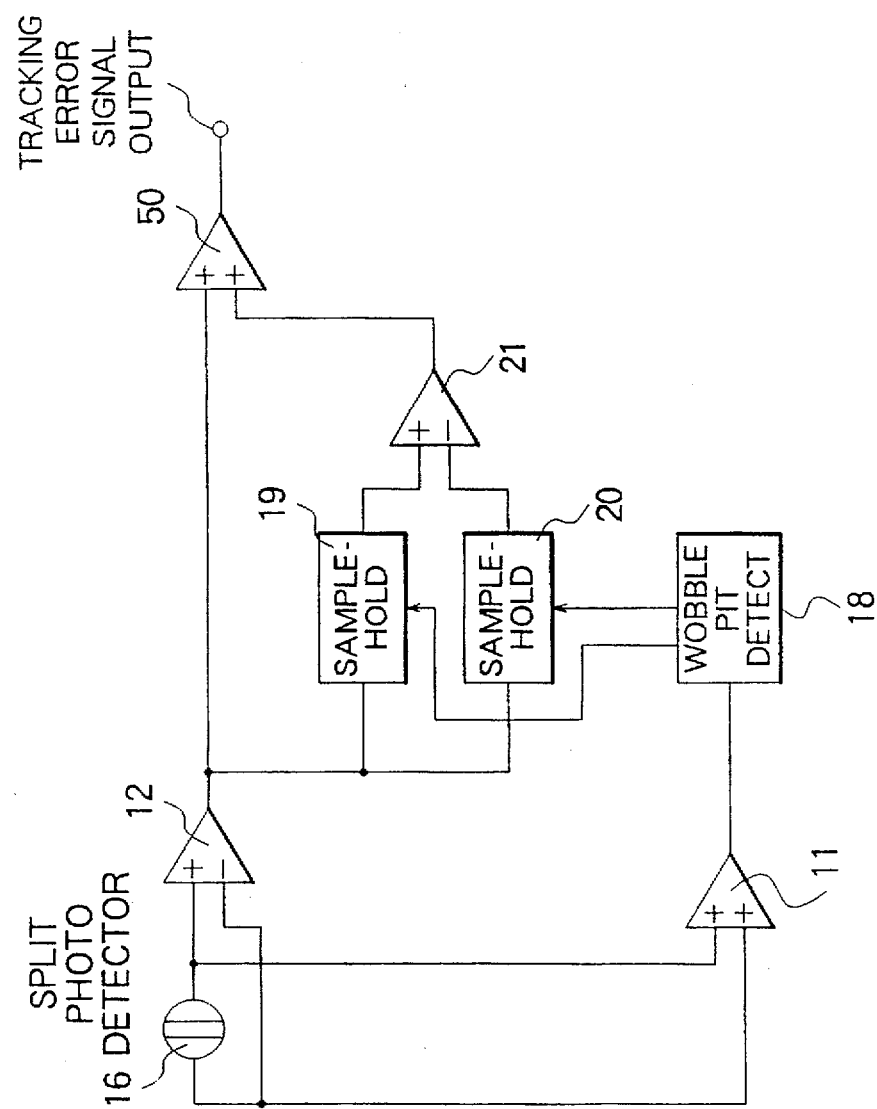
FIG. 26 is a block diagram showing a part of a conventional optical disk drive device concerning the tracking error signal offset correction using wobble pits.

FIG. 20 is a block diagram showing an optical disk drive device having the function of offset correction described above in Embodiment 3, and an offset automatic adjuster 52 for correcting the offset which occurs in the servo circuit. A low-pass compensating circuit 51 is to enhance the track-following ability of the servo system in the low-frequency region. The illustrated circuit further comprises an adder 53, a gain compensating circuit 54 for the servo system, a phase compensating circuit 55 for the servo system, a driver 56, and a tracking actuator 57 for driving the objective lens of the optical head.

By providing the sample-hold circuit 41 dedicated to the tracking error signal polarity reversal, as shown in FIG. 17 or FIG. 19, even when the address pits or the recognition flag for the sector at the connecting point is not detected, the offset correction value determined at the time of the preceding connecting point can be used, so that the disturbance of the servo operation due to the tracking error signal polarity reversal can be avoided. For instance, in the case of FIG. 17, the address pits 4 or the recognition flag (any of 32 to 35) is detected by the PLL and data detector 36 and the pattern matching circuit 37, and if the sector is a normal sector (which is not at a connecting point) the sample-hold circuit 42 is made to operate by the output of the mirror surface detecting circuit 39, and the differential amplifier 44 corrects the offset due to push-pull. The connecting point detecting circuit 38 detects whether the sector in question is at a connecting point, and if the sector is at a connecting point, the sample-hold circuit 41 is made to operate at the timing from the mirror surface detection circuit 39, and the differential amplifier 43 corrects the offset.

If the detection of the mirror surface fails at a connecting point because of a scratch on the disk, for example, then the offset value held by the sample-hold circuit 41 one period before is kept used, to ensure stable operation. If the detection also failed one period before, the value obtained two periods before is used. To generalize, the value obtained at the time of the latest successful detection of the mirror surface is used. This is because the connecting points are aligned in the radial direction of the disk, so that the offset ΔTt due to the mounting error of the photodetector 16 and the stray light in the optical head, the offset ΔTi from the photodetector 16 to the polarity reversing circuit 10, and the offset 6 due to the tilting of the disk are substantially constant, and because the angle of rotation with respect to the direction of the eccentricity of the optical disk is also the same the offset ΔTg due to the shift of the objective lens is also substantially constant. The correction of offset at the connecting point varies substantially compared with the offset at the normal sectors, so that correction is indispensable. On the other hands, in the normal sectors, when the number of sectors per revolution is large, the correction value need not be updated every sector, but the correction value for one of the preceding sectors may be used.

The system having a correction circuit dedicated to the tracking error signal polarity reversal, and using the mirror surface detection can be used in combination with the circuit using wobble pits to perform correction, as shown in FIG. 19. In this case too, the sample-hold circuit 41 in FIG. 19 holds the offset at the connecting point, and the differential amplifier 43 subtracts the offset held at the sample-hold circuit 41 from the output of the differential amplifier 12 to achieve the correction. The correction of offset at the normal sectors is achieved by having the differential amplifier 49 create a tracking error signal from the wobble pits, and having the adder 50 add the tracking error signal from the differential amplifier 49 to the original tracking error signal (from the differential amplifier 43). In this way, the tracking operation using the wobble pits, free from offset in the low-frequency region as shown in FIG. 27 (as in the prior art) can be achieved. In this case too, the amount of correction of the offset at the connecting point is large compared with the amount of correction at the normal sectors, so that offset due to the mirror surface alone is extracted, and used for feed-forward correction. The correction loop using the wobble pits is not accompanied with a rapid change even when tracking error signal polarity reversal is effected, and but with a slow change which can be corrected by a control loop having the gain G2 in FIG. 27.

When the offset of the servo circuit itself is to be corrected, the offset of the sensor system is corrected, and then correction by the use of the offset automatic adjuster 52 is effected, as shown in FIG. 20. The circuits 51, 52, 53, 54, 55 and 56 serve to correct the offset due to the tracking control circuits and actuator. For this purpose, the signal is so adjusted that its center is at a reference voltage, such as 0 volts, on the basis of the tracking error signal before the tracking servo operation. In the method of correction using the mirror surface and the wobble pits, the offset from the polarity reversing circuit to the actuator cannot be corrected. This is why the separate circuit for such correction is required.

What is claimed is:

1. An optical disk of a single-spiral configuration, in which land tracks and groove tracks are connected at connecting points, occurring every revolution, so that land tracks and groove tracks alternate along a continuous spiral track, the tracks being divided into sectors divided by header regions, each sector in a land or groove track has one or more sequences of address pits in the header region preceding said each sector, said sequences of address pits indicating the address of said each sector, said address pits are shifted in a first direction lateral of the land track by half a track pitch (a full track pitch being the distance between the land and groove tracks adjacent to each other) with respect to the track having the sector whose address is indicated by the address pits, so that the center line of the sequences of the address pits is aligned with a boundary between a land track and a groove track following the header, the address pits for a sector in a land track are shifted with respect to the address pits for a sector in a groove track in the direction of the track, so that the they do not overlap in the radial direction, the address pits for sectors in land and groove tracks adjacent to each other are so arranged in the direction of the track that they are scanned by a light spot in the order of a first sequence of address pits for the sector in one of the land track and the groove track, and then a second sequence of address pits for the sector in the other of the land track and the groove track.

2. The optical disk according to claim 1, further comprising a mirror surface part provided following said first and second sequences of address pits in a header at the connecting point.

3. The optical disk according to claim 2, wherein the length of the mirror surface part, or the disposition of the mirror surface part in a header at the connecting point is different from the length of the mirror surface part, or the disposition of the mirror surface part in a header which is not at a connecting part.

4. The optical disk according to claim 2, wherein the two or more mirror surface parts are provided in at least the headers at a connecting point, or the headers which are not at a connecting point, and the number of the mirror surface parts in a header at the connecting point is different from the number of the mirror surface parts in a header which is not at a connecting part.

5. The optical disk according to claim 1, further comprising a flag provided in a header indicating that the header is at a connecting point, or the header precedes a header at a connecting point by a predetermined number of sectors, said flag representing a value different from any of the values of the sector addresses.

6. The optical disk according to claim 1, wherein the sector address value is incremented according to a known rule, along the spiral.

7. An optical disk drive device using the optical disk of a single-spiral configuration, in which land tracks and groove tracks are connected at connecting points, occurring every revolution, so that land tracks and groove tracks alternate along a continuous spiral track, the tracks being divided into sectors divided by header regions, each sector in a land or groove track has one or more sequences of address pits in the header region preceding said each sector, said sequences of address pits indicating the address of said each sector, said address pits are shifted in a first direction lateral of the land track by half a track pitch (a full track pitch being the distance between the land and groove tracks adjacent to each other) with respect to the track having the sector whose address is indicated by the address pits, so that the center line of the sequences of the address pits is aligned with a boundary between a land track and a groove track following the header, the address pits for a sector in a land track are shifted with respect to the address pits for a sector in a groove track in the direction of the track, so that the they do not overlap in the radial direction, the address pits for sectors in land and groove tracks adjacent to each other are so arranged in the direction of the track that they are scanned by a light spot in the order of a first sequence of address pits for the sector in one of the land track and the groove track, and then a second sequence of address pits for the sector in the other of the land track and the groove track, said device updating the offset at each connecting point, and comprising:

means for generating a light spot and causing the light spot to scan along the track;

means for generating a tracking error signal on the basis of a light reflected from the light spot on the disk;

means for reversing the polarity of the tracking error signal when the light spot passes a connecting point;

means for removing an offset contained in the tracking error signal, generated when said light spot is passing said first and second sequences of address pits in a header at the connecting point, on the basis of the amount of light reflected from said first and second sequences of address pits; and means for controlling the scanning position of the light spot, responsive to the tracking error signal having the offset removed.

8. The device according to claim 7, and wherein the optical disk further comprises a mirror surface part provided following said first and second sequences of address pits in a header at the connecting point, and said device performs offset correction using the tracking error signal from the mirror surface part.

9. The device according to claim 8, wherein the optical disk has the sector address value which is incremented according to a known rule, along the spiral, and said device further comprises means for determining whether the light spot is scanning a header at a connecting point, based on the address values.

10. The device according to claim 7, comprising a polarity reversing circuit for reversing the polarity of the tracking error signal;

a first offset correction means for correcting offset in the tracking error signal based on the tracking error signal just after the polarity reversal at each connecting point; and a second offset correcting means for correcting offset in the tracking error signal based on the tracking error signal at each header.

11. The device according to claim 10, wherein said first offset correction means corrects the offset based on the tracking error signal at the output of the polarity reversing circuit; and said second offset correcting means corrects the offset based on the tracking error signal at the output of said polarity reversing circuit.

12. The device according to claim 10, wherein said disk further comprises a mirror surface part provided following said first and second sequences of address pits in a header at the connecting point, and said first offset correction means corrects the offset based on the tracking error signal obtained when the light spot is scanning a mirror surface part in a header at a connecting point;

said second offset correction means corrects the offset based on the tracking error signal obtained when the light spot is scanning said first and second sequences of address pits in a header at every sector.

13. The device according to claim 10, wherein said first offset correction means corrects the offset based on the tracking error signal obtained when the light spot is scanning said first and second sequences of address pits in a header at a connecting point; and said second offset correction means correct the offset based on the tracking error signal obtained when the light spot is scanning said first and second sequences of address pits in a header at every sector.

14. The device according to claim 10, wherein when the detection of the connecting point fails, the offset value obtained at the time of detection of the preceding connecting point continues to be used for the correction.

15. The device according to claim 7, wherein said offset removing means comprises:

a first offset correction means for correcting offset due to reversal of the polarity of the tracking error signal;

a second offset correction means for correcting offset introduced at the tracking error detecting means;

a third offset correcting means for correcting offset introduced in said tracking control circuit;

said first and second offset correction means performing the offset correction during tracking operation, and said third offset correcting means performing the offset correction before the tracking control operation is started.

* * * * *

UNITED STATES PATENT AND TRADEMARK OFFICE
CERTIFICATE OF CORRECTION

PATENT NO. : 5,754,506
DATED : May 19, 1998
INVENTOR(S) : Masato Nagasawa, et al.

It is certified that error appears in the above-identified patent and that said Letters Patent is hereby corrected as shown below:

Claim 1, line 21, change "that the" to --that--

Claim 8, line 1, change "and wherein" to --wherein--

Signed and Sealed this

Sixteenth Day of February, 1999

Attest:

Attesting Officer

Acting Commissioner of Patents and Trademarks